US010507907B2

(12) United States Patent
Bordoley et al.

(10) Patent No.: US 10,507,907 B2
(45) Date of Patent: Dec. 17, 2019

(54) VORTEX GENERATORS RESPONSIVE TO AMBIENT CONDITIONS

(71) Applicant: THE BOEING COMPANY, Chicago, IL (US)

(72) Inventors: Anat Bordoley, Seattle, WA (US); Brian J. Tillotson, Kent, WA (US); Michael Chih-Huan Wang, Seattle, WA (US); Dan J. Clingman, Milton, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/783,742

(22) Filed: Oct. 13, 2017

(65) Prior Publication Data

US 2018/0118332 A1 May 3, 2018

Related U.S. Application Data

(62) Division of application No. 14/491,916, filed on Sep. 19, 2014, now Pat. No. 9,789,956.

(51) Int. Cl.
*B64C 21/10* (2006.01)
*B64C 23/06* (2006.01)
*B64C 13/02* (2006.01)

(52) U.S. Cl.
CPC .............. *B64C 21/10* (2013.01); *B64C 13/02* (2013.01); *B64C 23/06* (2013.01); *B64C 2230/06* (2013.01); *Y02T 50/162* (2013.01)

(58) Field of Classification Search
CPC . B64C 21/10; B64C 13/02; B64C 2027/7288; B64C 23/06; B64C 23/065; B64C 2230/06; Y02T 50/162

USPC ............ 244/199.3, 198, 199.1, 199.2, 199.4, 244/200.1, 204.1, 99.8, 200, 201, 203, 244/204, 213–219, 46, 99.2, 172.6, 173.3, 244/131

See application file for complete search history.

(56) References Cited

U.S. PATENT DOCUMENTS

| 2,764,373 A | 9/1956 | Anderson et al. |
| 3,974,986 A | 8/1976 | Johnstone |
| 5,367,970 A * | 11/1994 | Beauchamp ............ B63B 1/248 114/140 |

(Continued)

FOREIGN PATENT DOCUMENTS

| CN | 200977653 Y | 11/2007 |
| CN | 102442428 A | 5/2012 |

(Continued)

OTHER PUBLICATIONS

European Search Report for EP Application No. 15185618.4, dated Feb. 8, 2016.

(Continued)

*Primary Examiner* — Theodore V Adamos
(74) *Attorney, Agent, or Firm* — Patterson + Sheridan, LLP

(57) ABSTRACT

A deployable vortex generator attached to a lifting surface includes a vane moveable relative to the lifting surface. The vane moves from a deployed position to a retracted position in response to a change in ambient conditions. In the deployed position, the vane acts on the air flow to create vortices. In the retracted position, the vane is closely aligned with the free stream velocity.

17 Claims, 25 Drawing Sheets

(56) References Cited

U.S. PATENT DOCUMENTS

| | | | |
|---|---|---|---|
| 5,869,189 A * | 2/1999 | Hagood, IV | H01L 41/082 310/357 |
| 6,105,904 A | 8/2000 | Lisy et al. | |
| 6,131,853 A | 10/2000 | Bauer et al. | |
| 6,427,948 B1 * | 8/2002 | Campbell | B64C 23/06 244/130 |
| 7,150,434 B1 | 12/2006 | Bandyopadhyay | |
| 7,334,760 B1 | 2/2008 | Lisy et al. | |
| 7,550,189 B1 * | 6/2009 | McKnight | B32B 3/10 148/563 |
| 7,753,316 B2 * | 7/2010 | Larssen | B64C 7/00 244/199.4 |
| 7,878,457 B2 | 2/2011 | Narramore | |
| 7,997,538 B2 * | 8/2011 | Osborne | B64C 9/32 244/199.4 |
| 8,087,617 B2 | 1/2012 | Sclafani et al. | |
| 8,201,773 B1 * | 6/2012 | Durham | B64C 39/028 244/218 |
| 8,256,720 B2 | 9/2012 | Ikeda | |
| 8,342,447 B2 * | 1/2013 | Etling | B64C 7/00 244/215 |
| 8,413,928 B2 * | 4/2013 | Rawlings | B64C 21/10 244/130 |
| 2001/0006207 A1 * | 7/2001 | Caton | B64C 7/00 244/213 |
| 2004/0129838 A1 | 7/2004 | Lisy et al. | |
| 2008/0035788 A1 * | 2/2008 | Kothera | B63B 1/248 244/99.8 |
| 2008/0217485 A1 * | 9/2008 | Ikeda | B64C 23/06 244/204.1 |
| 2008/0265102 A1 * | 10/2008 | Larssen | B64C 7/00 244/203 |
| 2010/0213320 A1 * | 8/2010 | Daynes | B64C 3/48 244/200 |
| 2011/0001016 A1 * | 1/2011 | Skillen | B64C 3/40 244/218 |
| 2013/0255796 A1 * | 10/2013 | Dimascio | F16S 5/00 137/334 |
| 2014/0331665 A1 * | 11/2014 | Shivashankara | B64C 9/32 60/527 |
| 2015/0129715 A1 * | 5/2015 | Madsen | B64C 13/30 244/99.8 |

FOREIGN PATENT DOCUMENTS

| | | |
|---|---|---|
| EP | 0516468 A2 | 12/1992 |
| EP | 2801521 A1 | 11/2014 |
| VA | 9950141 A | 10/1999 |

OTHER PUBLICATIONS

Chinese Office Action for Application No. 2015105995699 dated Apr. 12, 2019.

* cited by examiner

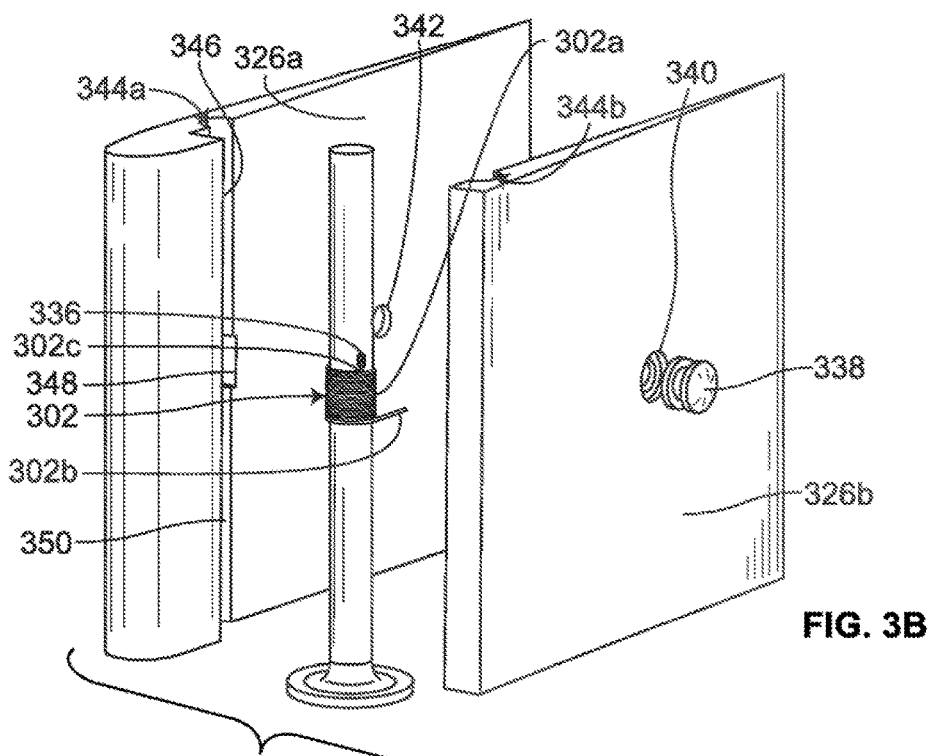
FIG. 3B
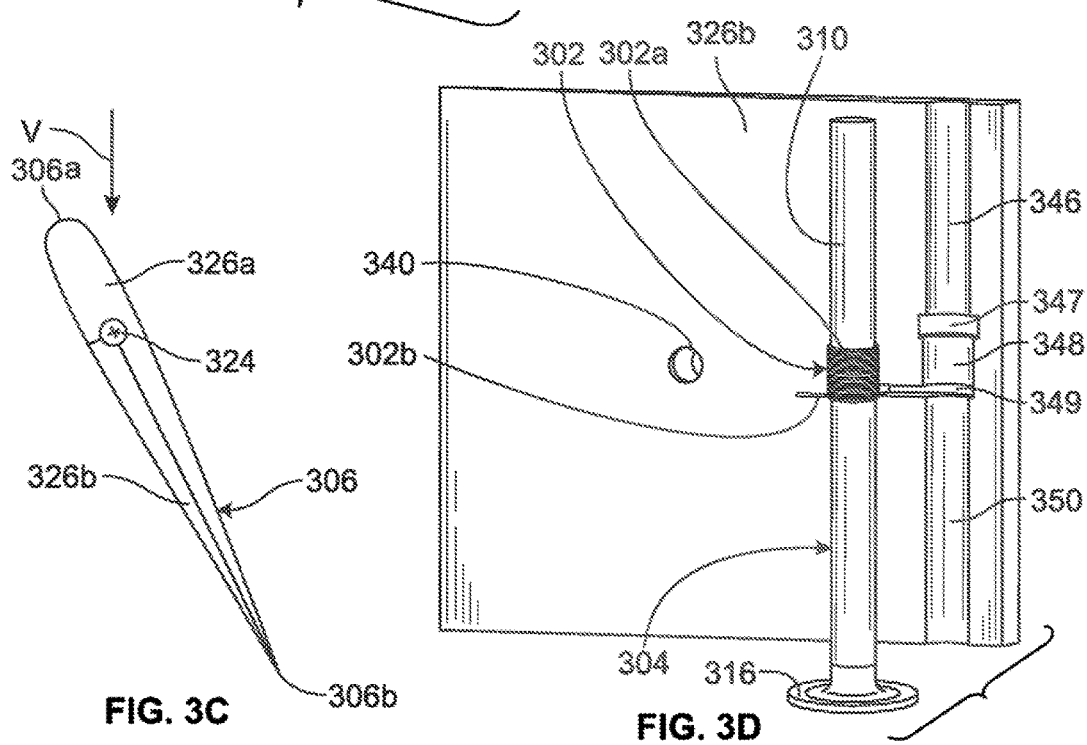
FIG. 3C
FIG. 3D

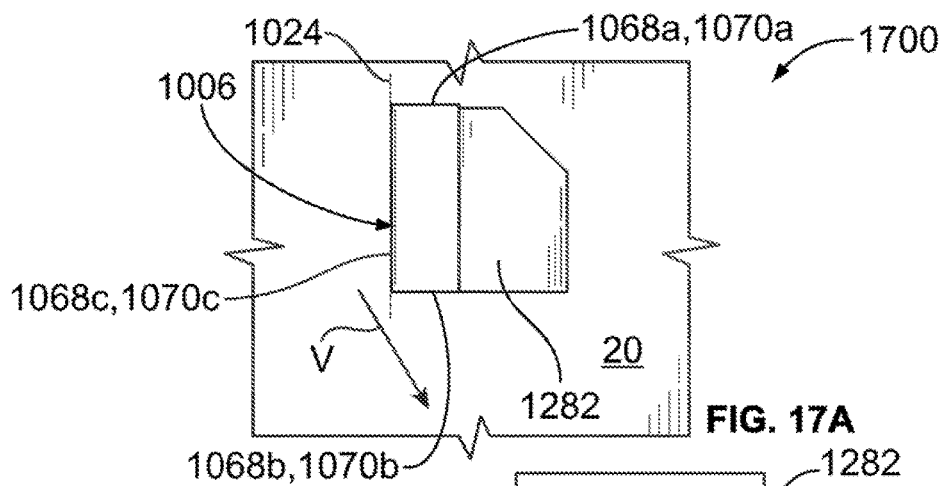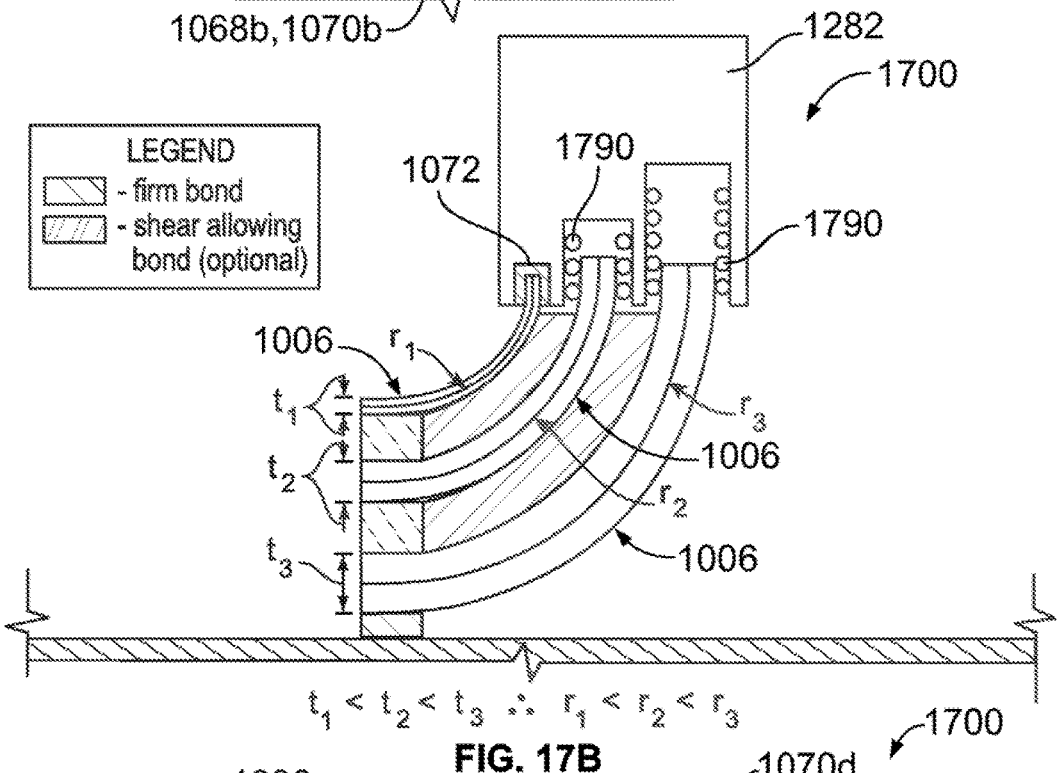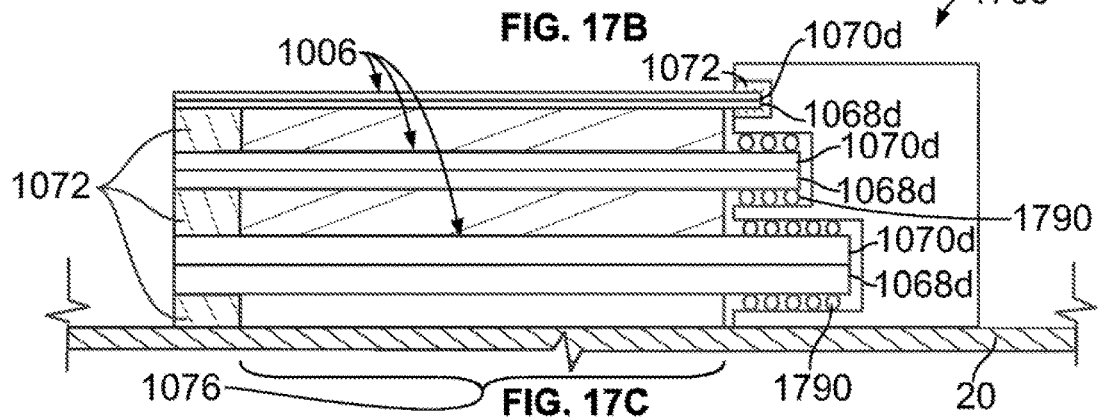

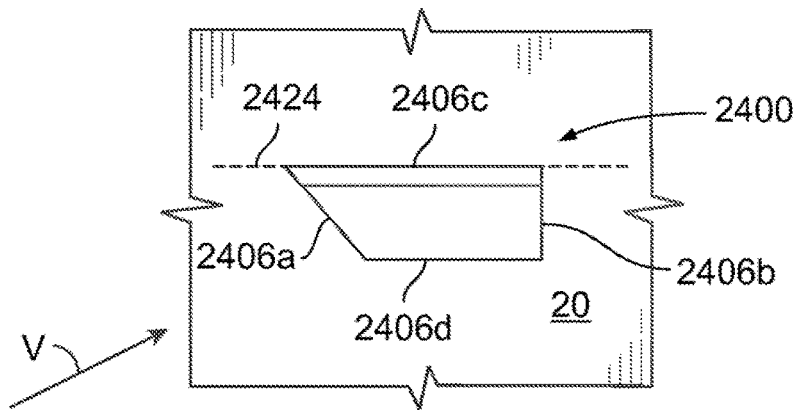
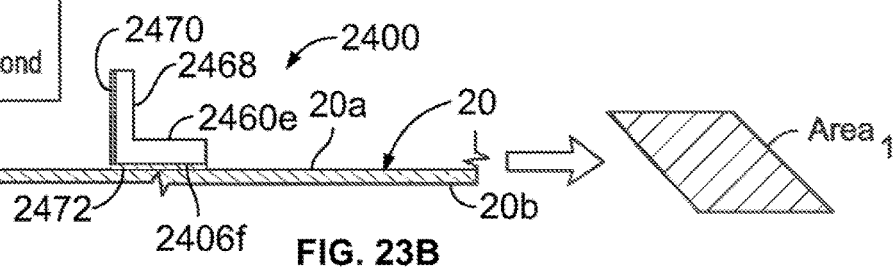
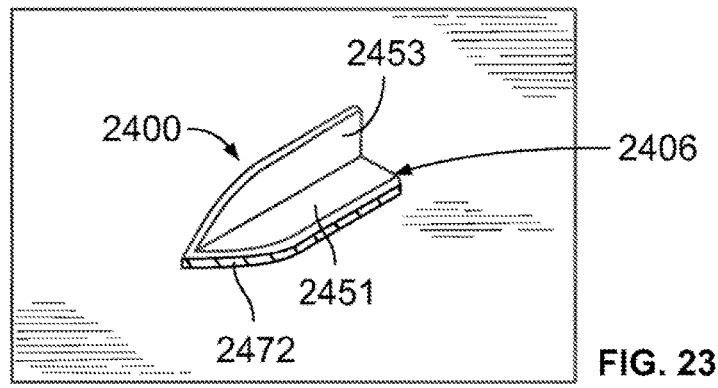
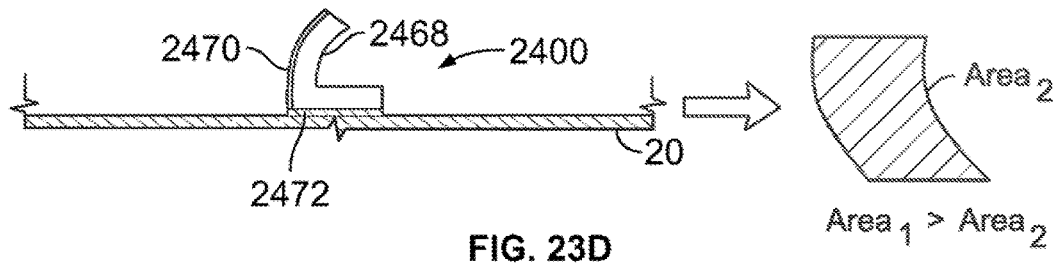

VORTEX GENERATORS RESPONSIVE TO AMBIENT CONDITIONS

CROSS-REFERENCE TO RELATED APPLICATIONS

This application is a divisional of U.S. application Ser. No. 14/491,916, filed Sep. 19, 2014, now U.S. Pat. No. 9,789,956, which is herein incorporated by reference.

FIELD OF THE INVENTION

Embodiments of the present disclosure relate generally to flow over a lifting surface. More particularly, embodiments of the present disclosure relate to a deployable vortex generator for improving fluid dynamic characteristics of flow over a lifting surface.

BACKGROUND OF THE INVENTION

Flow separation generally occurs when a boundary layer travels from a leading edge of a lifting surface and far enough against an adverse pressure gradient that a speed of the boundary layer relative to the lifting surface falls almost to zero. Fluid flow may become detached from the lifting surface, and instead form eddies and vortices. In aerodynamics, flow separation can often result in increased drag and reduced lift. Flow separation generally deteriorates low speed performance by causing boundary layer separation at high angles of attack. Deteriorated low speed performance in turn increases a "stall speed" of the lifting surface and potentially causes non-optimal flight conditions when the lifting surface is operating at low speed flight associated with takeoff and approach to landing.

Deployable vortex generators extend during low speed flight to keep the flow attached, but retract during cruise flight to reduce flow separation. Prior art deployable vortex generators, such as that disclosed in U.S. Pat. No. 8,087,617, require wires and actuators that add cost and weight, negating most of the benefit of retracting.

SUMMARY OF THE INVENTION

A deployable vortex generator attached to a lifting surface includes a vane moveable relative to the lifting surface. The vane moves from a deployed position to a retracted position in response to a change in ambient conditions. In the deployed position, the vane acts on the air flow to create vortices. In the retracted position, the vane is closely aligned with the free stream velocity.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 3B is an exploded perspective view of the vortex generator of FIG. 3A;

FIG. 3C is a top plan view of the vortex generator of FIG. 3A;

FIG. 3D is a partial exploded perspective view of the vortex generator of FIG. 3A;

FIG. 17A is a top plan view of a seventeenth embodiment of a deployable vortex generator which incorporates the features of the present invention;

FIG. 17B is a side elevation view of the vortex generator of FIG. 17A in a deployed position;

FIG. 17C is a side elevation view of the vortex generator of FIG. 17A in a retracted position;

FIG. 23A is a top plan view of a twentieth embodiment of a deployable vortex generator which incorporates the features of the present invention;

FIG. 23B is a side elevation view of the vortex generator of FIG. 23A in a deployed position;

FIG. 23C is a perspective view of the vortex generator of FIG. 23A in a retracted position;

FIG. 23D is a side elevation view of the vortex generator of FIG. 23A in a retracted position.

DETAILED DESCRIPTION

Figure 1A:
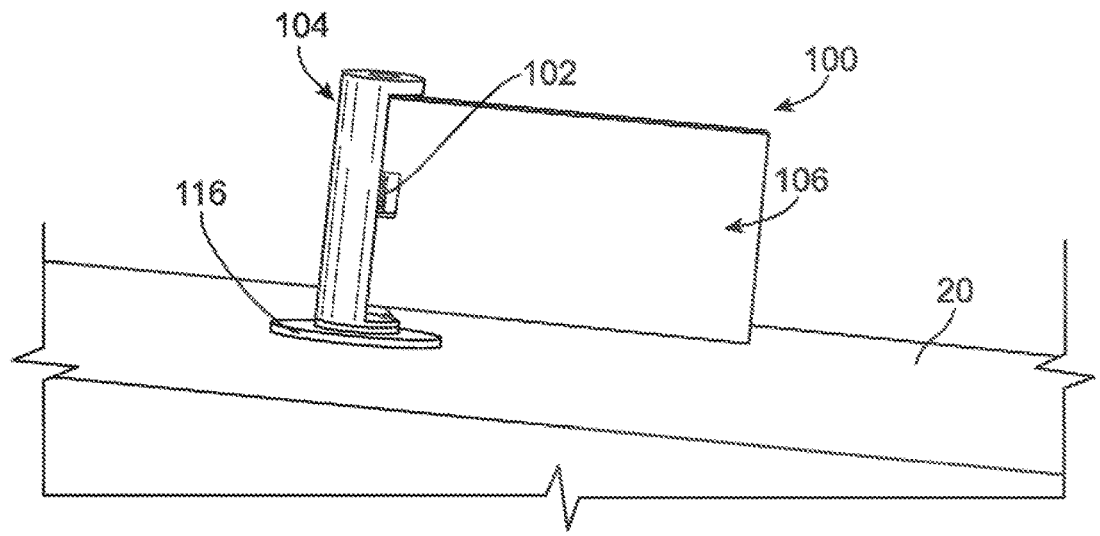
FIG. 1A is a perspective view of a first embodiment of a deployable vortex generator which incorporates the features of the present invention, such vortex generator is shown attached to a lifting surface.
Figure 1B:
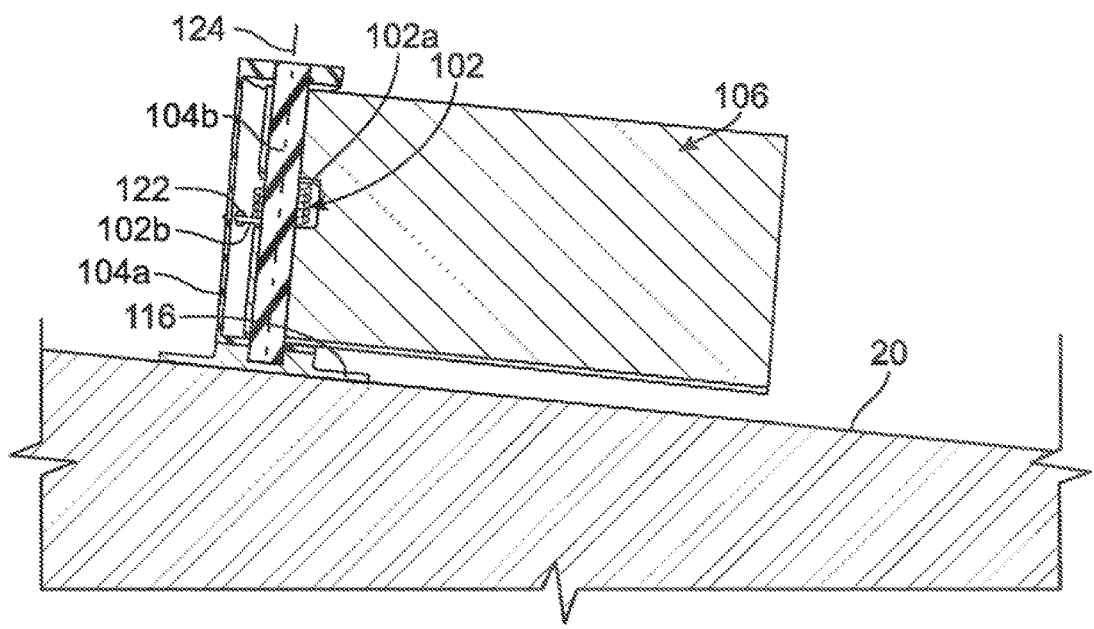
FIG. 1B is a cross-sectional view of the vortex generator of FIG. 1A.
Figure 1C:
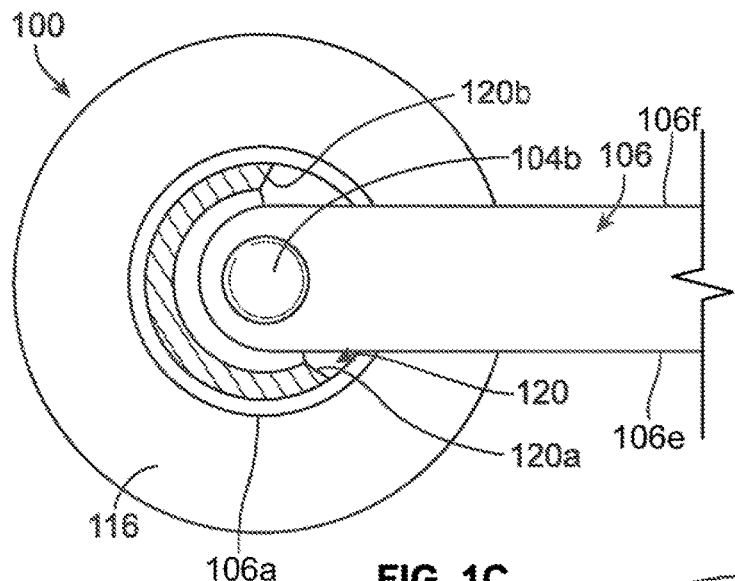
FIG. 1C is a partial cross-sectional view of the vortex generator of FIG. 1A.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 24:
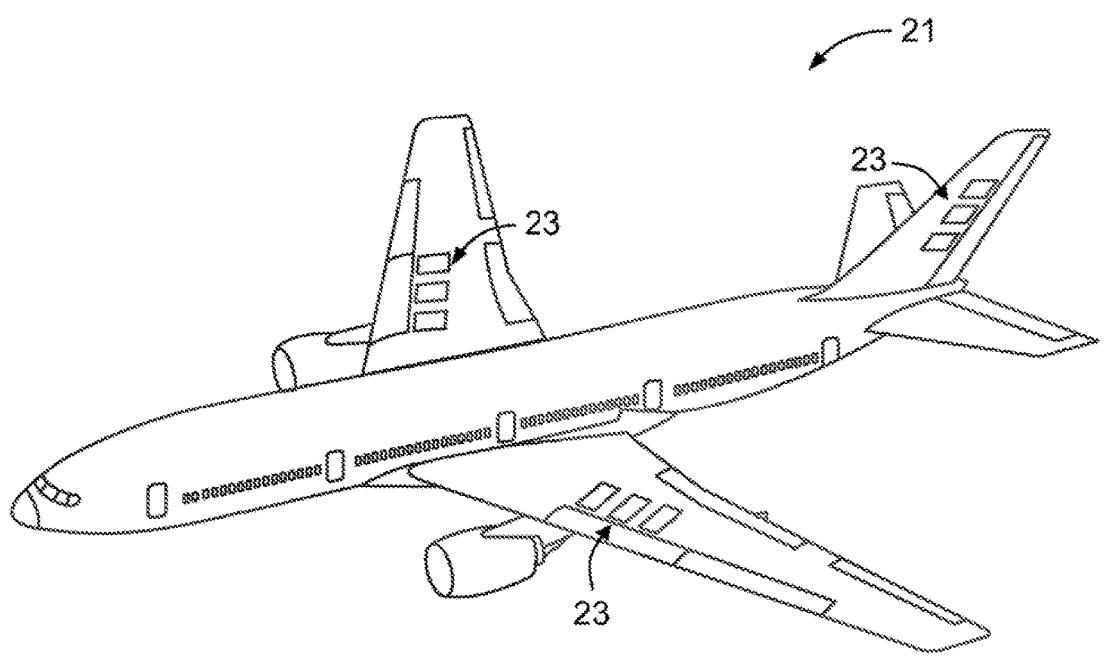
FIG. 24 is a perspective of an aircraft which incorporates the features of the present invention.

A deployable vortex generator is provided that moves from a deployed position during low speed flight (takeoff and approach to landing) of an aircraft 21, to a retracted position during cruise flight of an aircraft 21. As defined herein, "low speed flight" are the speeds of the aircraft 21 during takeoff and during approach to landing. The vortex generator moves from the deployed position to the retracted position as a result of a change in the ambient conditions surrounding the vortex generator. The vortex generator is mounted on a lifting surface 20 of an aircraft 21, for example, but not limited to, the wings, nacelles, flap, empennage, a control surface of the aircraft 21 such as an elevator and an aileron, an engine strut, a wind turbine blade, to reduce flow separation, some positions of which are generally shown in FIG. 24 at blocks 23 which represents the vortex generators of the present invention in a schematic view, and are not drawn to scale. When located on the engine nacelle, the vortex generator is located on the inboard edge (i.e. the side closest to the fuselage). The number of vortex generators on the wings and vertical stabilizer vary depending on the model of the aircraft. Embodiments of the disclosure, however, are not limited to such lifting surface applications, and the techniques described herein may also be utilized in other fluid dynamic surface applications. For example, embodiments may be applicable to other lift surfaces such as a sail boat sail, an engine propeller, a windmill, and the like.

In each embodiment, when in the deployed position, the vortex generator is at a predetermined angle relative to the direction of the free stream velocity (V) such that the vortex generator acts on the airflow to create vortices during low speed flight. In each embodiment, when in the retracted position, the ambient conditions cause the vortex generator to move to a retracted position which is more closely aligned with the direction of the free stream velocity (V) such that the vortex generator is removed, or substantially removed, from the airflow to reduce drag.

In the embodiments of the vortex generator shown in FIGS. 1A-9B, the ambient conditions are the aerodynamic force acting on the vortex generator during flight (e.g., during takeoff, approach to landing, or at cruising altitude), a change in which causes the vortex generator to move between the deployed and retracted positions. In the embodiments of the vortex generator shown in FIGS. 10-26D, the ambient conditions are the atmospheric temperature (e.g., during takeoff, approach to landing, or at cruising altitude), a change in which causes the vortex generator to move between the deployed and retracted positions. It will be appreciated that a deployed and/or retracted position of one configuration of a vortex generator according to the present disclosure may differ from a respective deployed and/or retracted position of another configuration of a vortex generator according to this disclosure, as will be further described.

Attention is invited to a first embodiment of the vortex generator 100 shown in FIGS. 1A-1H. The vortex generator 100 is formed of a two-part mount 104 formed of a first part 104a and a second part 104b, a vane 106 attached to the second part 104b of the mount 104, and a torsion spring 102 connected between the mount 104 and the vane 106. The first part 104a of the mount 104 is attached to the lifting surface 20, and the second part 104b is rotatably mounted in the first part 104a.

Figure 1D:
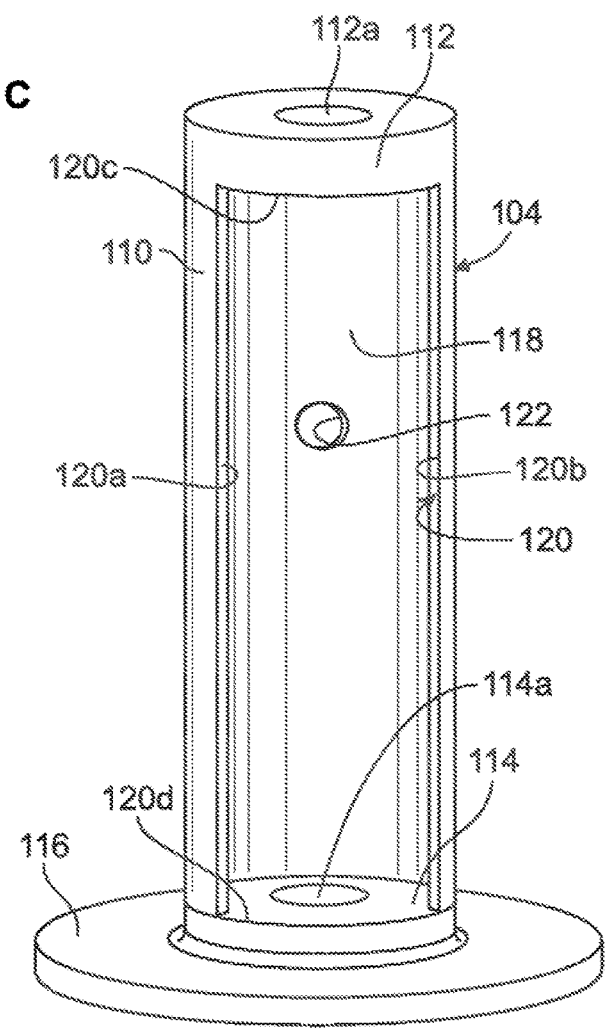
FIG. 1D is a perspective view of a portion of a mount of the vortex generator of FIG. 1A.

As best shown in FIG. 1D, the first part 104a of the mount 104 is formed from a hollow cylindrical side wall 110 having outer and inner ends, an outer wall 112 closing the outer end of the side wall 110, an inner wall 114 closing the inner end of the side wall 110, and a flange 116 extending outwardly from the inner wall 114. The side, outer and inner walls 110, 112, 114 form a cavity 118. The outer and inner walls 112, 114 have aligned circular openings 112a, 114a extending therethrough. An elongated, generally rectangular slot 120 extends through the side wall 110 and extends between the outer and inner walls 112, 114. The slot 120 is in communication with the cavity 118 and is defined by opposite first and second side edges 120a, 120b, an outer edge 120c and an inner edge 120d. The first and second side edges 120a, 120b of the slot 120 define an arc length. An opening 122 is provided through the side wall 110 at a position spaced between the outer and inner walls 112, 114, and the opening 122 is preferably diametrically opposed to the slot 120. The mount 104 is made of suitable materials, such as metal, and the flange 116 is attached to the lifting surface 20 of the aircraft 21 by suitable means, such as welding. An axis 124 extends along the length of the mount 104. The vane 106 is configured to rotate or pivot about the axis 124 and accordingly, the axis 124 may be interchangeably referred to as rotational axis 124. In some example, the axis 124 is perpendicular to the lifting surface 20 of the aircraft 21. In further examples, and depending upon the geometry of the vane 106, the axis may be arranged at an angle of less than 90 degrees relative to the lifting surface 20.

Figure 1E:
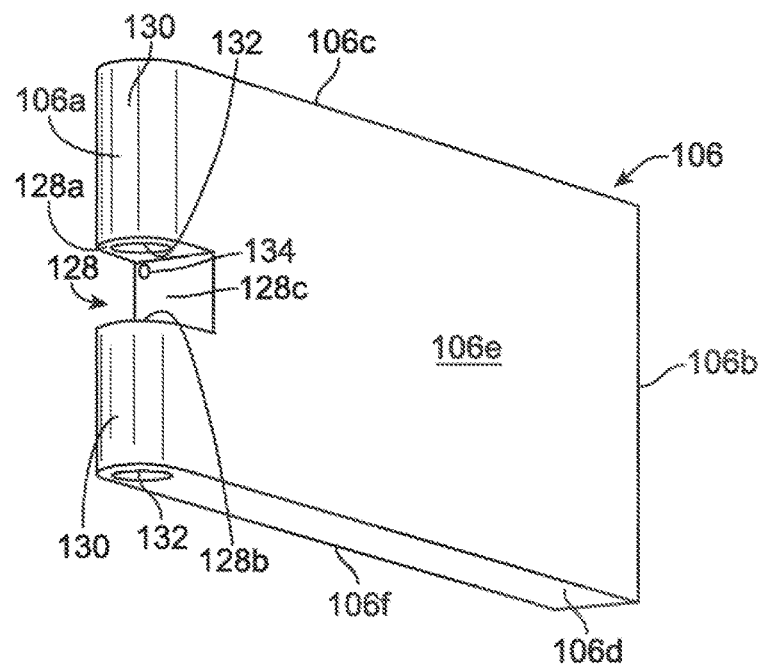
FIG. 1E is a perspective view of a vane of the vortex generator of FIG. 1A.
Figure 1F:
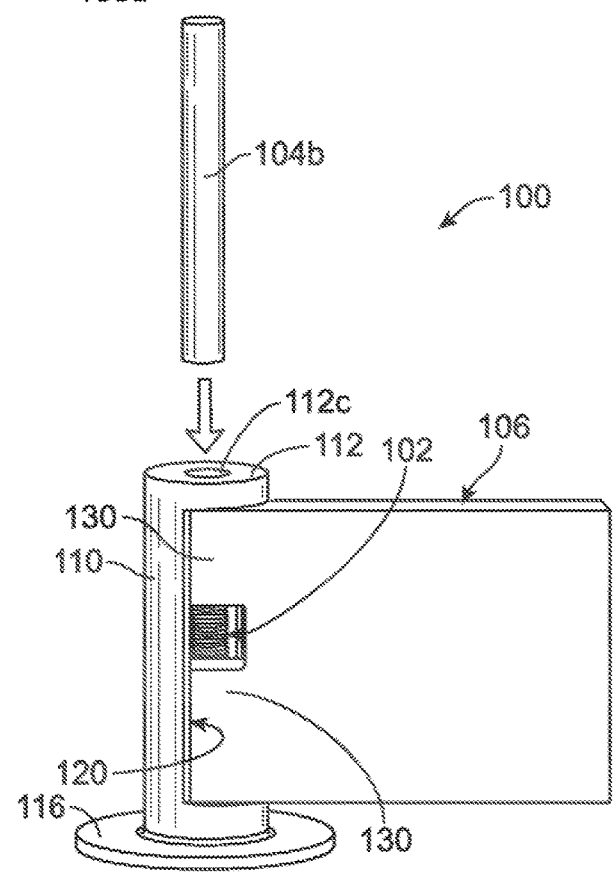
FIG. 1F is an exploded perspective view of the vortex generator of FIG. 1A.

As best shown in FIG. 1F, the second part 104b of the mount 104 is formed from an elongated cylindrical pin. The ends of the second part 104b conform to the shape of the openings 112a, 114a.

As best shown in FIG. 1E, the vane 106 may be generally rectangular and has a leading edge 106a, which may be curved or otherwise aerodynamically shaped, and a trailing edge 106b, which may be tapered or blunt (e.g., having a planar surface at the trailing edge 106b as shown in the illustrated example in FIG. 1E). The vane 106 may further include outer and inner opposite edges 106c, 106d, and first and second opposite side surfaces 106e, 106f extending between the edges 106a, 106b, 106c, 106d. The side surfaces 106e, 106f are planar, and may be parallel to each other as shown, or may taper from the leading edge 106a to the trailing edge 106b. In some examples, the vane 106 may have an airfoil shape similar to the shape of vane 306 discussed below. A cutout 128 is provided in the vane 106 near the midpoint of the leading edge 106b. The cutout 128 commences at the leading edge 106b and extends rearwardly a predetermined distance. The cutout 128 has an outer wall 128a, an inner wall 128b and a trailing wall 128c extending between the outer and inner walls 128a, 128b. The cutout 128 divides a forward portion of the vane 106 into outer and inner sections 130. Each section 130 has a passageway 132 extending therethrough. A bore 134 is provided in the rear wall 128c of the cutout 128 proximate to the outer section 130. A width of the vane 106 is defined between the first side surface 106e and the second side surface 106f.

The torsion spring 102 is conventional and has a main coil 102a having an opening, a first leg (not shown) extending outwardly from the main coil 102a and a second leg 102b extending outwardly from the main coil 102a, for example, at a diametrically opposed position from the first leg 102b.

To assemble the vortex generator 100, the spring 102 is inserted into the cutout 128 and the first leg of the spring 102 seats within the bore 134 in the vane 106. The sections 130 are passed through the slot 120 and seat within the cavity 118 in the first part 104a of the mount 104. The second leg 104b of the spring 102 seats within the opening 122 in the side wall 110. The second part 104b is then inserted through the opening 112a in the outer wall 112 of the first part 104a, through the passageway 132 in the outer section 130 of the vane 106, into the cutout 128 and through the opening in the torsion spring 102, through the passageway 132 in the inner section 130 of the first part 104a, and into the opening 114a in the inner wall 114 of the first part 104a. The first part 104a encases the second part 104b, the sections 130 of the vane 106, and the torsion spring 102. While the first leg of the spring 102 that engages with the vane 106 is described as being above the main coil 102a and the second leg 102b of the spring 102 that engages with the first part 104a is described as being below the main coil 102a, it is to be understood that these relative positions can be reversed. The second part 104b of the mount 104 is free to rotate with respect to the vane 106, the first part 104a of the mount 104, and the spring 102. The vane 106 rotates relative to the second part 104a around axis 124. An enlarged cap or cotter pin (not shown) is attached to the mount 104 to secure the second part 104b to the first part 104a.

The width of the vane 106 is less than the length of the arc defined by the slot 120 in the first part 104a. This allows the vane 106 to rotate along a predetermined arc length relative to the first part 104a around the second part 104b, and the edges 120a, 120b of the slot 120 limit the range of angles through which the vane 106 rotates relative to the first part 104a.

The spring 102 is fixed into position by the first leg being embedded into the vane 106, and the second leg 102b being embedded into the first part 104a. When a force is exerted on the vane 106, the spring 102 winds up, instead of rotating about its axis 124.

The free stream velocity (V) during takeoff is less than the free stream velocity (V) at cruising speed. At takeoff, the vortex generator 100 is in its deployed position which is at some predetermined angle βslow, preferably approximately 10-25 degrees, relative to the direction of the free stream velocity (V) as a result of the force of the spring 102. Because the vortex generator 100 is deployed, the vortex generator 100 generates vortices (and accompanying drag) during low speed flight. As the airplane climbs in altitude and the free stream velocity (V) increases, the aerodynamic forces act on the vane 106 at cruising speed and compress the spring 102, which causes the vane 106 to rotate relative to the first part 104a until the spring 102 is in force and moment equilibrium. At this point the vortex generator 100 is substantially aligned with the airflow along the free stream velocity (V) to minimize the amount of drag it produces. During approach to landing, the free stream velocity (V) decreases and the spring 102 uncoils or unwinds which causes the vane 106 to rotate in the opposite direction relative to the first part 104a to its deployed position, thereby generating vortices for landing.

Figure 1G:
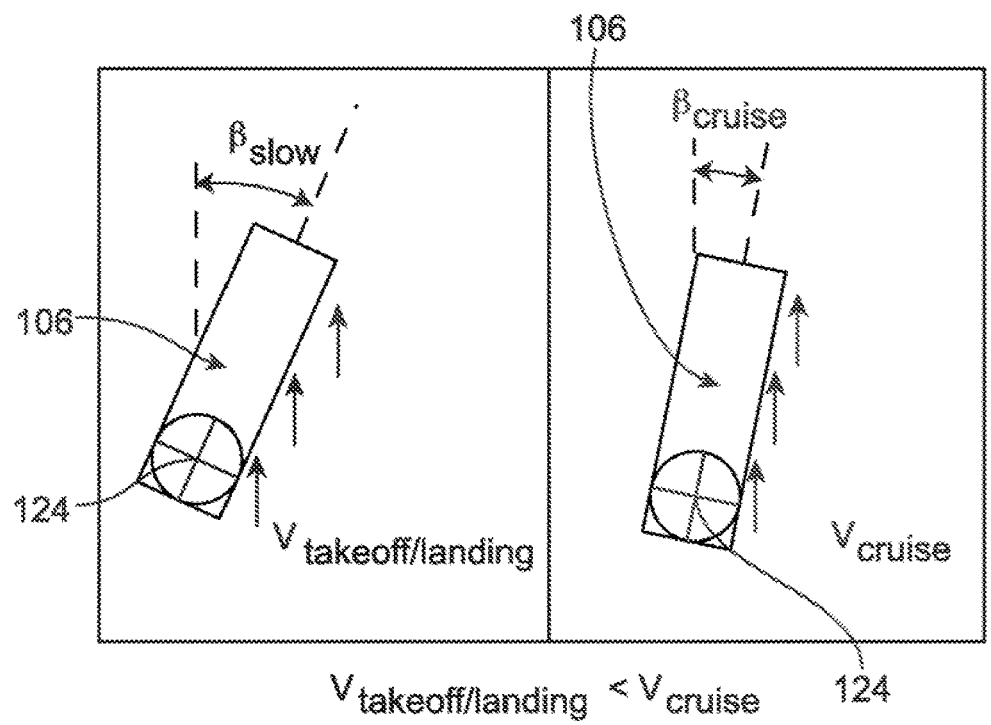
FIG. 1G shows schematic views of the deployed position shown by the left-hand side of the figure of the vortex generator of FIG. 1A, and the retracted position shown by the right-hand side of the figure of the vortex generator of FIG. 1A.

As shown in FIG. 1G, the vortex generator 100 is in its retracted position at cruising speed which is at some predetermined angle βcruise, preferably any angle from 0<b<10 degrees (excluding zero degrees) relative to the direction of the free stream velocity (V). Angle βcruise is more closely aligned with the direction of the free stream velocity (V) than the angle βslow. The vortex generator 100 uses the difference in velocity between cruising speed and low speed flight to adjust the angle of the vane 106 relative to the direction of the free stream velocity (V). The aerodynamic forces and the spring 102 rotate the vane 106 between the deployed and retracted positions. The deployed position is shown by the left-hand side of the schematic of FIG. 1G, and the retracted position is shown by the right-hand side of FIG. 1G. As shown, angle βslow is greater than angle βcruise. Lift and parasitic drag act on the vane 106 during flight.

Figure 1H:
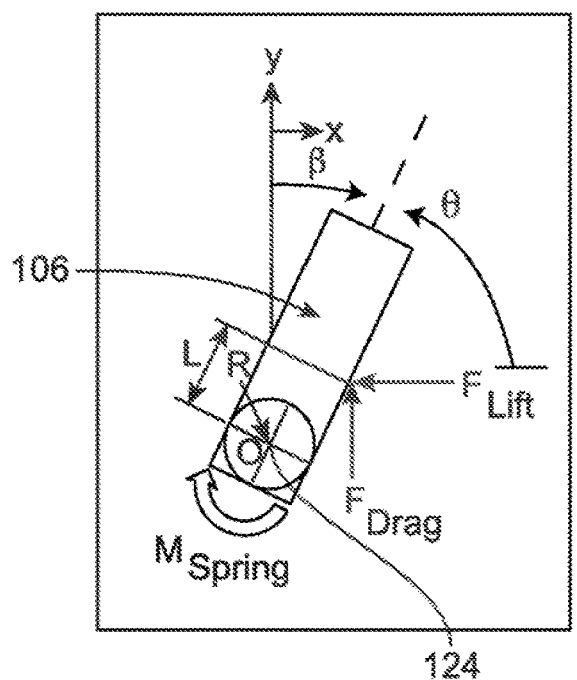
FIG. 1H shows a free body diagram which depicts forces and moments acting on the vane of the vortex generator of FIG. 1A.

The free body diagram in FIG. 1H depicts the forces and moments acting on the vane 106. The drag force acts in the direction of the free stream velocity (V) which is the y direction in FIG. 1H. The lift force acts perpendicular to the direction of the free stream velocity (V) which is the x direction in FIG. 1H. The lift and drag on the vane 106 depend on the velocity, air density, planform area, angle and lift and drag coefficients of the vane velocity. The higher aerodynamic forces at cruising speed rotate the vane 106 to a smaller angle relative to the mount 104. The smaller angle reduces the aerodynamic forces on the vane 106 since the planform area relative to the direction of the free stream velocity (V) is smaller. The spring 102 provides an opposing torque that is high enough to resist the aerodynamically induced torque during low speed flight, and low enough to not resist the aerodynamically induced torque at cruising speed. The torque for the two bounds is set by defining the angle of the vane 106 relative to the direction of the free stream velocity (V) for the two flight conditions.

Figure 2:
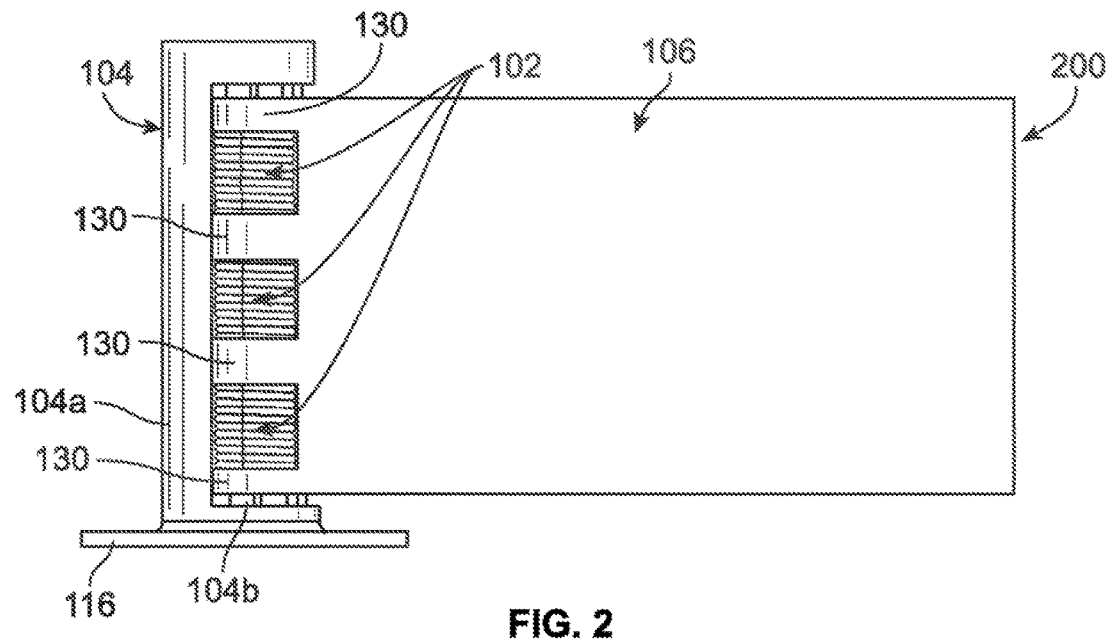
FIG. 2 is a side elevation view of a second embodiment of a deployable vortex generator which incorporates the features of the present invention.
Figure 3A:
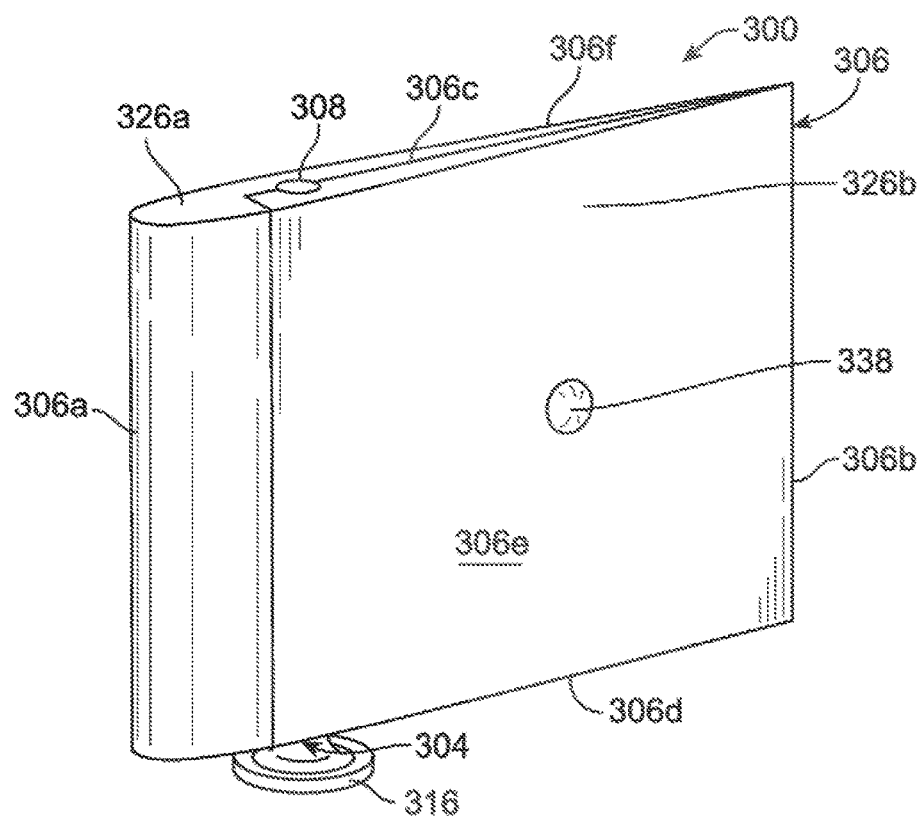
FIG. 3A is a perspective view of a third embodiment of a deployable vortex generator which incorporates the features of the present invention.

FIG. 2 shows a second embodiment of the vortex generator 200 which is identical to the first embodiment, except for the differences noted herein. In this second embodiment of the vortex generator 200, the leading edge 106a of the vane 106 has a plurality of cutouts 128 (three cutouts 128 shown in the example in FIG. 2, but any other number of cutouts may be used) which divides the leading edge 106a into a plurality of sections 130 (in the illustrated example, four sections 130). A plurality of torsion springs 102 are provided in parallel (in the illustrated example, three torsion springs 102), along with their associated openings 122 in the first part 104a of the mount 104 and the bores 134 in the vane 106. The spring constant for each spring 102 is selected such that a combined force provided by the springs 102 is sufficiently high to position the vane 106 in the deployed position during low speed flight and sufficiently low to allow the springs 102 to move the vane 106 to the retracted position in response to the increased free stream velocity (V) at cruising speed. In the particular example shown in FIG. 2, the spring constant of each spring 102 is about one-third of the spring constant provided with the single spring 102 shown in the first embodiment. The springs 102 provide a combined torque that is sufficiently high at low speed flight and sufficiently low at cruising speed. If one of the springs 102 fails, then the two remaining springs 102 provide for redundancy and provide a torque that is high enough to deploy the vane 106 in low speed flight.

Attention is invited to a third embodiment of the vortex generator 300 shown in FIGS. 3A-3D. The vortex generator 300 is formed of a mount 304, a two-part vane 306, formed of a first part 326a and a second part 326b, attached to the mount 304, and a torsion spring 302 connected between the mount 304 and the vane 306. The mount 304 is attached to the lifting surface 20.

The mount 304 is formed from a cylindrical, elongated side wall 310 (also referred to herein as cylindrical member 310) having outer and inner ends, and a flange 316 extending outwardly from the inner end of the side wall 310. An axis 324 of the mount 304 is defined along the length of the mount 304. The vane 306 is configured to rotate or pivot about the axis 324 and accordingly, the axis 324 may be interchangeably referred to as rotational axis 324. In some examples, the axis 324 may be perpendicular to the lifting surface 20 of the aircraft 21. In further examples, and depending upon the geometry of the vane 306, the axis 324 may be arranged at an angle of less than 90 degrees relative to the lifting surface 20. A protrusion 336 extends outwardly from the side wall 310 of the mount 304. The protrusion 336 has a bore therein which faces the inner end of the side wall 310.

The mount 304 is made of suitable materials, such as metal, and the flange 316 is attached to the lifting surface 20 of the aircraft 21 by suitable means, such as welding. In the illustrated example, the mount 304 extends perpendicular to the lifting surface 20 of the aircraft 21.

The first part 326a of the vane 306 is attached to the second part 326b of the vane 306 by suitable means, such as a rivet 338 extending through aligned apertures 340, 342 in the parts 326a, 326b. When attached, the vane 306 may be generally rectangular and has a leading edge 306a, which may be curved or otherwise aerodynamically shaped, and a trailing edge 306b, which may be tapered or blunt (e.g., having a planar surface at the trailing edge 306b as shown in the illustrated example in FIG. 1E). The vane 306 may further include outer and inner opposite edges 306c, 306d, and first and second opposite side surfaces 306e, 306f extending between the edges 306a, 306b, 306c, 306d. The side surfaces 306e, 306f may taper from the leading edge 306a to the trailing edge 306b as shown, or may be parallel to each other. In this examples, the vane 306 has an airfoil shape.

Each part 326a, 326b defines a portion 344a, 344b of a passageway which extends from the outer edge 306c to the inner edge 306d, such that when the parts 326a, 326b are mated together, a complete passageway is formed, the passageway configured to receive at least a portion of the mount 304. The passageway is proximate to, but spaced from, the leading edge 306a of the vane 306. As such, the vane 306 extends partly forward of the axis of rotation (e.g., axis 324) which is defined along the length of the passageway, which reduces the drag moment and allows for a smaller spring constant.

Portion 344a of the passageway includes cylindrical first, second and third sections 346, 348, 350. The first section 346 extends from the outer edge 306c to the second section 348; the second section 348 extends from the first section 346 to the third section 350, the third section 350 extends from the second section 348 to the inner edge 306d. The first and third sections 346, 350 preferably have the same diameter. The diameter of the second section 348 is enlarged relative to the diameter of the first and third sections 346, 350. Portion 344b of the passageway includes cylindrical first, second, third sections 346, 348, 350, an intermediate section 347 between the first and second sections 346, 348 and a slot 349 between the second and third sections 348, 350. The first and third sections 346, 350 of the second part 326b preferably have the same diameter. The diameter of the second section 348 is enlarged relative to the diameter of the first and third sections 346, 350. The diameter of the intermediate section 347 is enlarged relative to the diameter of the second section 348. When mated, the first sections 346 align, the intermediate section 347 aligns with a lower end of the first section 346 of the first part 326a, the slot 349 aligns with a lower end of the second section 348 of the first part 326a, and the third sections 350 align.

The torsion spring 302 is conventional and has a main coil 302a having an opening, a first leg 302b extending from a first end of the main coil 302a and a second leg 302c extending from a second end of the main coil 302a.

To assemble the vortex generator 300, the spring 302 is slid onto the mount 304 and the second leg 302c is inserted into the bore in the protrusion 336 to secure the spring 302 to the mount 304. The assembled mount 304 and spring 302 are seated within the portion of the passageway of the first part 326a, with the spring 302 seating in the second portion 348. The second part 326b of the vane 306 is mated with the first part 326a, such that the protrusion 336 seats in the intermediate section 347, the spring 302 seats in the second section 348, and the first leg 302b of the spring 302 seats in the slot 349. The first and second parts 326a, 326b are secured together, such as by the rivet 338. As such, the first and second parts 326a, 326b encase the side wall 310 and the spring 302. While the first leg 302b of the spring 302 that engages with the mount 304 is described as being above the main coil 302a and the second leg 302c of the spring 302 that engages with the vane 306 is shown as being below the main coil 304a, it is to be understood that these relative positions can be switched. The vane 306 is free to rotate relative to the mount 304. An enlarged cap or cotter pin (not shown) is attached to the mount 304 to secure the vane 306 to the mount 304.

The spring 302 is fixed into position by the second leg 302c being embedded into the mount 304, and the first leg 302b being secured to the second part 326b of the vane 306. When a force is exerted on the vane 306, the spring 302 winds up, instead of rotating about its axis 324. The length of the intermediate section 347 limits the amount of travel of the vane 306 as the protrusion 336 will contact the edges of the intermediate section 347 and prevent further rotation of the vane 306 relative to the mount 304.

The free stream velocity (V) during takeoff is less than the free stream velocity (V) at cruising speed. At takeoff, the vortex generator 300 is in its deployed position which is at some predetermined angle relative to the direction of the free stream velocity (V) as a result of the force of the spring 302. Because the vortex generator 300 is deployed, the vortex generator 300 generates vortices (and accompanying drag) during low speed flight. As the airplane climbs in altitude and the free stream velocity (V) increases, the aerodynamic forces act on the vane 306 at cruising speed and compress the spring 302 until the spring 302 is in force and moment equilibrium. This causes the vane 306 to rotate relative to the mount 304 and more closely align with the direction of the free stream velocity (V) in its retracted position. At this point the vortex generator 300 is substantially aligned with the airflow of the free stream velocity (V) to minimize the amount of drag it produces. During approach to landing, the free stream velocity (V) decreases and the spring 302 expands which causes the vane 306 to rotate in the opposite direction relative to the mount 304 to its deployed position, thereby generating vortices for landing.

In this embodiment, the vane 306 extends partly forward of the axis of rotation 324 defined by the mount 304. This reduces the drag moment about axis 324 and allows for a smaller spring constant of spring 302.

Multiple springs 302, like that shown in FIG. 2 could be provided in this third embodiment.

Figure 4A:
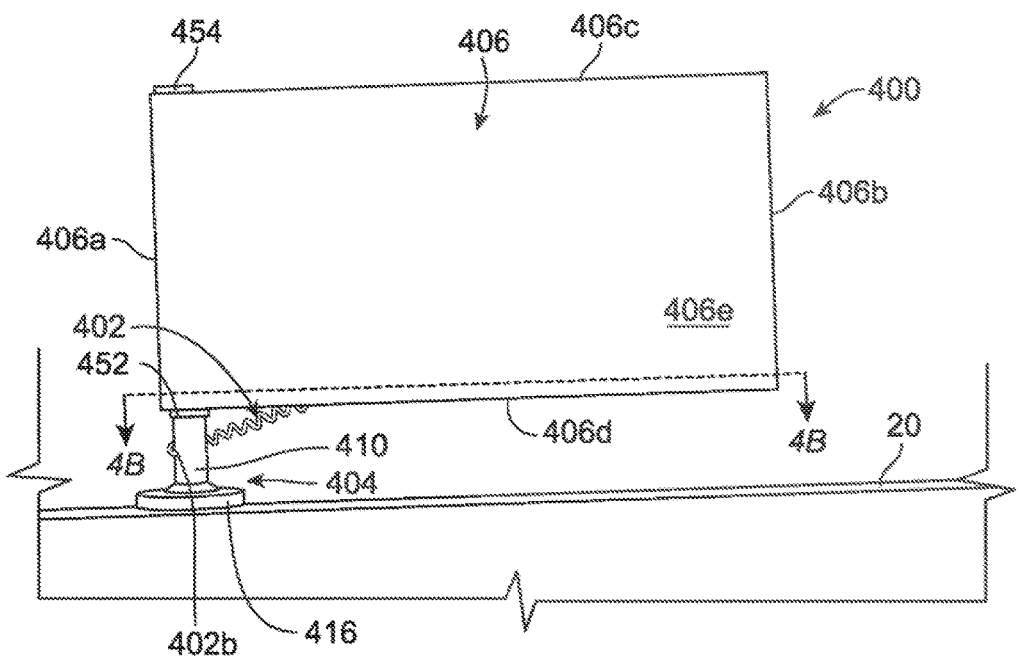
FIG. 4A is a side elevation view of a fourth embodiment of a deployable vortex generator which incorporates the features of the present invention.
Figure 4B:
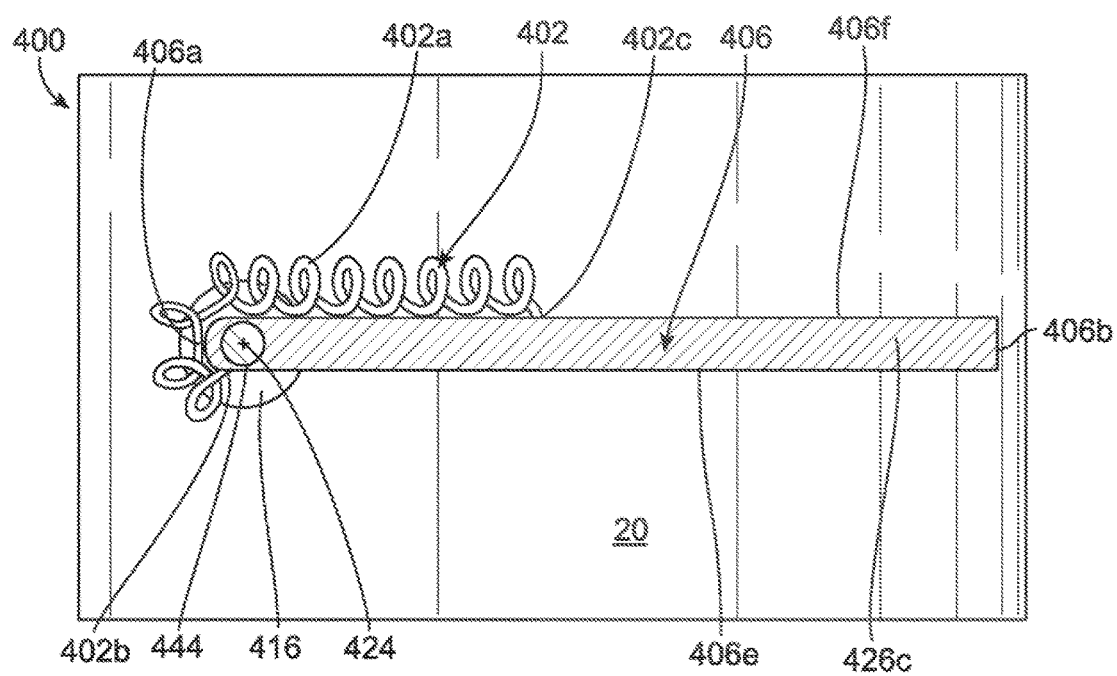
FIG. 4B is a cross-sectional view along line 4B-4B of FIG. 4A.

Attention is invited to the fourth embodiment of the vortex generator 400 shown in FIGS. 4A and 4B. The vortex generator 400 is formed of a mount 404, a vane 406 attached to the mount 404, and a linear spring 402 connected between the mount 404 and the vane 406. The mount 404 is attached to the lifting surface 20.

The mount 404 is formed from a cylindrical side wall 410 having outer and inner ends, a lip 452 extending outwardly from the side wall 410, and a flange 416 extending outwardly from the inner end of the side wall 410. The lip 452 is spaced from the inner end of the side wall 410 a predetermined distance. The mount 404 is made of suitable materials, such as metal, and the flange 416 is attached to the lifting surface 20 of the aircraft 21 by suitable means, such as welding. An axis 424 of the mount 404 extends along the length of the side wall 410. The axis 424 is perpendicular to the lifting surface 20 of the aircraft 21 such that the mount 404 extends perpendicular to the lifting surface 20 of the aircraft 21.

The vane 406 may be generally rectangular and has a leading edge 406a, which may be curved or otherwise aerodynamically shaped, and a trailing edge 406b, which may be tapered or blunt (e.g., having a planar surface at the trailing edge 406b). The vane 406 may further include outer and inner opposite edges 406c, 406d, and first and second opposite side surfaces 406e, 406f extending between the edges 406a, 406b, 406c, 406d. The side surfaces 406e, 406f are planar, and may be parallel to each other as shown, or may taper from the leading edge 406a to the trailing edge 406b. In some examples, the vane 406 may have an airfoil shape similar to the shape of vane 306 discussed above.

A passageway 444 is provided through the vane 406 proximate to its leading edge 406a and extends from the outer end to the inner end. The passageway 444 conforms in shape to the side wall 410 of the mount 404. A width of the vane 406 is defined between the first side surface 406e and the second side surface 406f.

The spring 402 is a linear extension spring 402 which is conventional. The spring 402 has a main coil 402a having first and second ends 402b, 402c.

To assemble the vortex generator 400, the vane 406 is slid along the mount 404 by passing the side wall 410 through the passageway 444 until the bottom edge of the vane 406 engages with the lip 452. The lip 452 has a larger dimension than the passageway 444 to prevent the further travel of the vane 406 along the side wall 410. The first end 402b of the spring 402 is rigidly attached to the mount 404 proximate to the side surface 406e of the vane 406, the spring 402 is wrapped around the mount 404 and extends along the opposite side surface 406f of the vane 406, and the second end 402c of the spring 402 is rigidly attached to the side surface 406f of the vane 406. The second end 402c is connected to the side surface 406f of the vane 406 at a position which is spaced from the leading edge 406a of the vane 406. The spring 402 allows the vane 406 to rotate along a predetermined arc length relative to the mount 404. An enlarged cap 454 is attached to the mount 404 to secure the vane 406 to the mount 406.

The spring 402 is fixed into position by the first end 402b being embedded into the mount 404, and the second end 402c being embedded into the vane 406. When a force is exerted on the vane 406, the spring 402 expands to allow the vane 406 to rotate relative to the mount 404.

The free stream velocity (V) during takeoff is less than the free stream velocity (V) at cruising speed. At takeoff, the vortex generator 400 is in its deployed position which is at some predetermined angle relative to the direction of the free stream velocity (V) as a result of the force of the spring 402. Because the vortex generator 400 is deployed, the vortex generator 400 generates vortices (and accompanying drag) during low speed flight. As the airplane climbs in altitude and the free stream velocity (V) increases, the aerodynamic forces act on the vane 406 at cruising speed and expand the spring 402 until the spring 402 is in force and moment equilibrium. This causes the vane 406 to rotate relative to the mount 404 and more closely align with the direction of the free stream velocity (V) in its retracted position. At this point the vortex generator 400 is substantially aligned with the airflow of the free stream velocity (V) to minimize the amount of drag it produces. During approach to landing, the free stream velocity (V) decreases and the spring 402 contracts which causes the vane 406 to rotate in the opposite direction relative to the mount 404 to its deployed position, thereby generating vortices for landing.

Figure 5A:
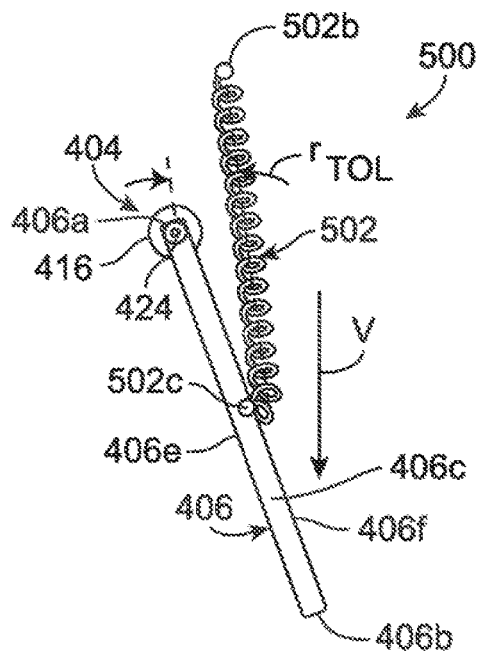
FIG. 5A is a top plan view of a fifth embodiment of a deployable vortex generator which incorporates the features of the present invention showing the vortex generator in a deployed position.
Figure 5B:
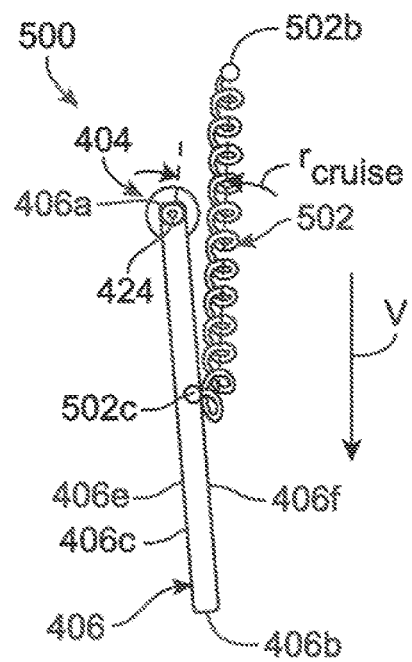
FIG. 5B is a top plan view of the vortex generator of FIG. 5A showing the vortex generator in a retracted position.

FIGS. 5A and 5B show a fifth embodiment of the vortex generator 500 which is identical to the fourth embodiment except for the differences described herein. In this fifth embodiment, a conventional linear tension spring 502 is provided, and the first end 502b of the spring 502 is secured to the lifting surface 20 instead of to the mount 404. The first end 502b is affixed to the lifting surface 20 forwardly of the leading edge 406a of the vane 406 and on the same side surface 406f of the vane 406 as the side where the second end 502c of the spring 502 is secured to the vane 406. When a force is exerted on the vane 406, the spring 502 expands to allow the vane 406 to rotate relative to the mount 404.

The free stream velocity (V) during takeoff is less than the free stream velocity (V) at cruising speed. At takeoff, the vortex generator 500 is in its deployed position which is at some predetermined angle relative to the direction of the free stream velocity (V) as a result of the force of the spring 502. Because the vortex generator 500 is deployed, the vortex generator 500 generates vortices (and accompanying drag) during low speed flight. As the airplane climbs in altitude and the free stream velocity (V) increases, the aerodynamic forces act on the vane 406 at cruising speed and expand the spring 502 until the spring 502 is in force and moment equilibrium. This causes the vane 406 to rotate relative to the mount 404 and more closely align with the direction of the free stream velocity (V) in its retracted position. At this point the vortex generator 500 is substantially aligned with the airflow of the free stream velocity (V) to minimize the amount of drag it produces. During approach to landing, the free stream velocity (V) decreases and the spring 402 contracts which causes the vane 406 to rotate in the opposite direction relative to the mount 404 to its deployed position, thereby generating vortices for landing.

In this fifth embodiment, the moment arm of the spring 502 about the axis 424 of the vane 406 varies as the vane 406 rotates. Typically, the moment arm increases as the vane 406 moves from its retracted to its deployed position. The benefits of this fifth embodiment are (a) increased torque margin for deploying and retracting the vane 406, (b) reduced vane 406 drag compared to using a torsion spring, and (c) reduced spring mass.

Multiple linear springs 502 may be used for redundancy. In addition, the linear springs 502 may be combined with torsion springs to achieve a desired curve of torque versus angle.

Figure 6A:
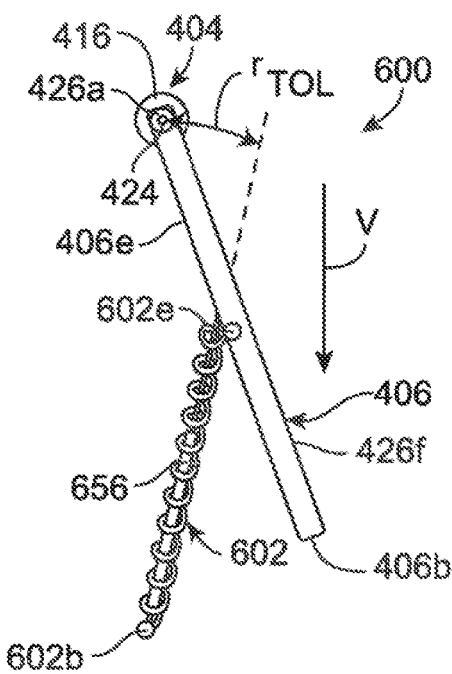
FIG. 6A is a top plan view of a sixth embodiment of a deployable vortex generator which incorporates the features of the present invention showing the vortex generator in a deployed position.
Figure 6B:
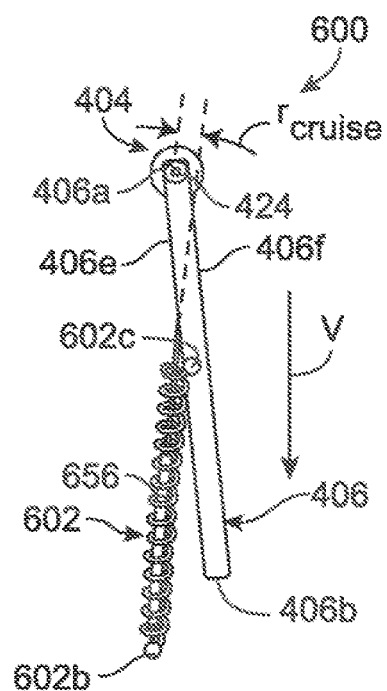
FIG. 6B is a top plan view of the vortex generator of FIG. 6A showing the vortex generator in a retracted position.

FIGS. 6A and 6B show a sixth embodiment of the vortex generator 600 which is identical to the fourth embodiment except for the differences described herein. In this sixth embodiment, a conventional linear compression spring 602 is provided, and the first end 602b of the compression spring 602 is secured to the lifting surface 20 instead of to the mount 404. The first end 602b is affixed to the lifting surface 20 rearwardly of the trailing edge 406b of the vane 406 and on the same side surface 406e of the vane 406 as the side surface 406e where the second end 406c of the spring 402 is secured to the vane 406. When a force is exerted on the vane 406, the spring 602 compresses to allow the vane 406 to rotate relative to the mount 404. A telescoping pin 656 is inserted into the main coil of the spring 602 to prevent the spring 602 from buckling during expansion and compression of the spring 602.

The free stream velocity (V) during takeoff is less than the free stream velocity (V) at cruising speed. At takeoff, the vortex generator 600 is in its deployed position which is at some predetermined angle relative to the direction of the free stream velocity (V) as a result of the force of the spring 602. Because the vortex generator 600 is deployed, the vortex generator 600 generates vortices (and accompanying drag) during low speed flight. As the airplane climbs in altitude and the free stream velocity (V) increases, the aerodynamic forces act on the vane 406 at cruising speed and compress the spring 602 until the spring 602 is in force and moment equilibrium. This causes the vane 406 to rotate relative to the mount 404 and more closely align with the direction of the free stream velocity (V) in its retracted position. At this point the vortex generator 600 is substantially aligned with the airflow of the free stream velocity (V) to minimize the amount of drag it produces. During approach to landing, the free stream velocity (V) decreases and the spring 402 expands which causes the vane 406 to rotate in the opposite direction relative to the mount 404 to its deployed position, thereby generating vortices for landing.

In this sixth embodiment, the moment arm of the spring 602 about the axis 424 of the vane 406 varies as the vane 406 rotates. The moment arm at low speed flight when the vane 406 is in its deployed position, is larger than the moment arm at cruising speed when the vane 406 is in in its retracted position.

The relative positions of the axis of rotation 424, the spring 602 mount 404 point, and the point where the spring 602 attaches to the vane 406 determine how the moment arm varies as the vane 406 rotates about its axis. The unstretched spring 602 length and the spring constant, together with the moment arm, determine the torque exerted by the spring 602. Torque values greater than zero act to extend the vane 406 from its retracted position to its deployed position. Torque values less than zero tend to retract the vane 406. The torsion spring exerts the highest torque at small angles of attack, i.e., at cruising speed. The linear spring with a varying moment arm exerts the highest torque at large angles of attack, i.e., at low speed flight, that is takeoff and approach to landing. The linear spring exerts more torque than the torsion spring, so there is a larger torque margin to fully extend the vane 406 against the aerodynamic torque. This helps maintain aircraft 21 control authority over a wider range of takeoff and approach to landing conditions. At cruising speed, the linear spring exerts less torque than the torsion spring, so the aerodynamic torque is able to depress the vane 406 to a smaller angle of attack. This reduces frontal area of the vane 406 and therefore reduces drag at cruising speed.

Multiple linear springs 602 may be used for redundancy. Linear springs 602 may be combined with torsion springs to achieve a desired curve of torque versus angle.

Figure 7:
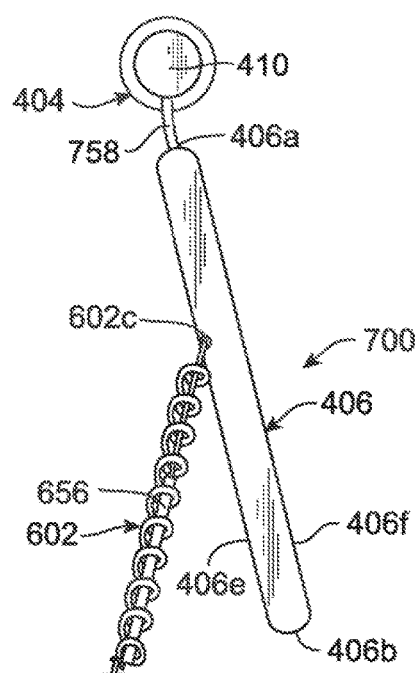
FIG. 7 is a top plan view of a seventh embodiment of a deployable vortex generator which incorporates the features of the present invention.

FIG. 7 shows a seventh embodiment of the vortex generator 700 which is identical to the sixth embodiment except for the differences described herein. In this embodiment, the mount 404 is rigidly affixed to the lifting surface 20 and has at least one flexible piece of material 758, or flexure, extending therefrom. The leading edge 406a of the vane 406 is attached to the opposite end of the flexure 758. In this embodiment, the flexure 758 acts as the hinge which allows for rotation of the vane 406 relative to the lifting surface 20. If the flexure 758 is formed as a separate piece from the mount 404 and the vane 406, the flexure 758 can be attached to the mount 404 and to the vane 406 by welding, clamping, and the like. Alternatively, the flexure 758 may be forged or machined as a thin region in the same piece of material as the vane 406, the mount 404, or both. This reduces part count and labor needed to assemble the vortex generator 700. Such a rigidly attached mount 404 and flexure(s) 758 can be substituted into the sixth embodiment.

Figure 8A:
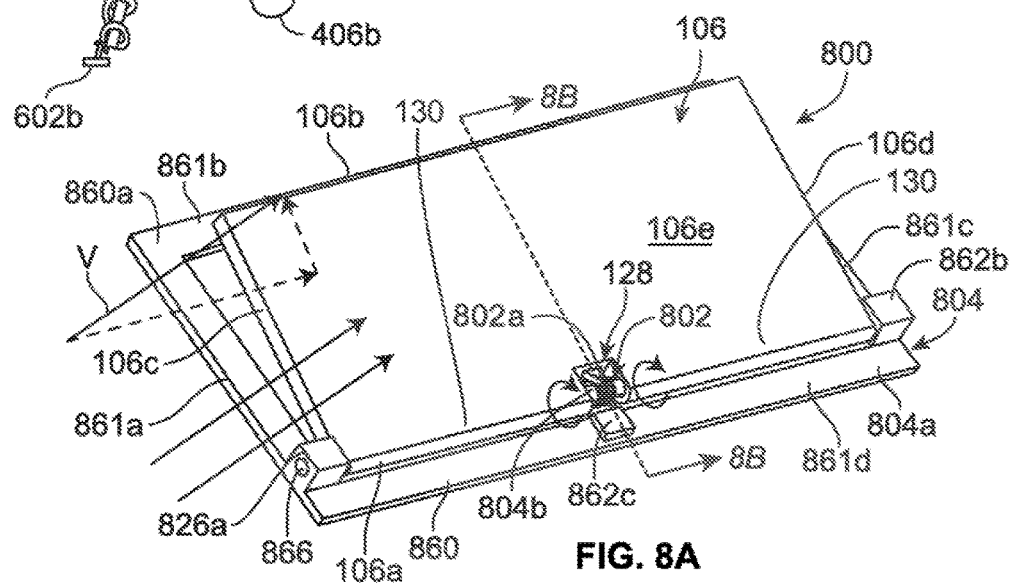
FIG. 8A is a perspective view of an eighth embodiment of a deployable vortex generator which incorporates the features of the present invention.
Figure 8B:
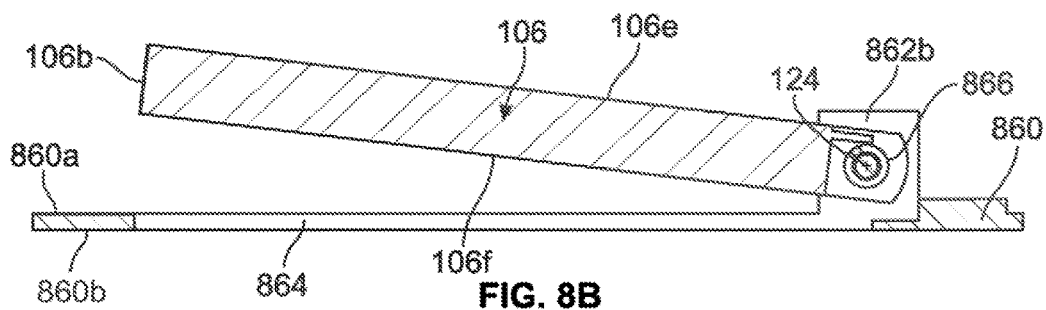
FIG. 8B is a side elevation view of the vortex generator of FIG. 8A.

FIGS. 8A and 8B show an eighth embodiment of the vortex generator 800. The rotation axis 124 of the vortex generator 800 is horizontally arranged relative to the lifting surface 20, instead of perpendicular as in the previous embodiments. The vortex generator 800 is formed of a two-part mount 804, the vane 106 attached to the mount 804, and a torsion spring 802 connected between the mount 804 and the vane 106. The mount 804 includes a first part 804a which is attached to the lifting surface 20, and a second part 804b which is rotatably mounted in the first part 804a and is attached to the vane 804.

The first part 804b of the mount 804 is formed from a plate 860 formed of four walls 861a, 861b, 861c, 861d having a cutout 864 therein. First and second spaced apart projections 862a, 862b extend from walls 861a, 861c. The plate 860 has an outer surface 860a, an inner surface 860b which conforms to the shape of the lifting surface 20, and a cutout 864 therethrough. The cutout 864 conforms in shape to the vane 106 (as shown, both are rectangular). The cutout 864 may instead be formed as a recess. The edges of the plate 860 may be beveled. The first projection 862a extends outwardly from the outer surface 860a of the plate 860 proximate to a first corner of the cutout 864, and the second projection 862b extends outwardly from the outer surface 860a of the plate 860 proximate to a second corner of the cutout 864. Each projection 862a, 862b has an opening 866 therethrough which align with each other and are parallel to the lifting surface 20. A protrusion 862c having a bore therein extends outwardly from the outer surface 860a, proximate to the midpoint of the cutout 864 between the protrusions 862a, 862b. The first part 804a of the mount 804 is made of suitable materials, such as metal, and the inner surface 860b of the first part 804a is attached to the lifting surface 20 of the aircraft 21 by suitable means, such as welding.

The second part 804b of the mount 804 is formed from an elongated cylindrical pin. The ends of the second part 804b conform to the shape of the openings 866 in the projections 862a, 862b.

The vane 106 of this eighth embodiment is identical to the vane 106 of the first embodiment and the specifics are not repeated. In this embodiment, the vane 106 is rotated so that the edge 106c of the first embodiment becomes the leading edge in this eighth embodiment, and the edge 106d of the first embodiment becomes the trailing edge in this eighth embodiment, and that surface 106e is an outer surface and surface 106f is an inner surface proximate to the lifting surface 20.

The torsion spring 802 is conventional and has a main coil 802a having an opening, a first leg (not shown) extending outwardly from the main coil 802a and a second leg (not shown) extending outwardly from the main coil 802a, for example, at a diametrically opposed position from the first leg 802b.

To assemble the vortex generator 800, the spring 802 is inserted into the cutout 128 and the first leg of the spring 802 seats within the bore 134 in the vane 106. The sections 130 seat between the projections 862a, 862b. The second leg of the spring 802 seats within the opening in the protrusion 862c on the plate 860. The second part 804b of the mount 804 is then inserted through the passageway 866 in the first projection 862a of the first part 804a, through the passageway 132 in the section 130 of the vane 106, into the cutout 128 and through the opening in the torsion spring 802, through the passageway 132 in the other section 130 of the first part 104a, and through the passageway 866 in the second projection 862b of the first part 804a. The second part 804b of the mount 804 is free to rotate with respect to the vane 106, the first part 804a of the mount 804, and the spring 802. The vane 106 rotates relative to the second part 804a around axis 124. An enlarged cap or cotter pin (not shown) is attached to the second part 804b of the mount 804 at each end thereof to secure the second part 804b to the mount 804.

The spring 802 is fixed into position by the first leg being embedded into the vane 106, and the second leg being embedded into the protrusion 862c of the second part 804b of the mount 804. When a force is exerted on the vane 106, the spring 802 winds up, instead of rotating about its axis 124.

The free stream velocity (V) during takeoff is less than the free stream velocity (V) at cruising speed. At takeoff, the vortex generator 800 is in its deployed position which is substantially perpendicular to the lifting surface 20 as a result of the force of the spring 802. The vane 106 is oriented at some predetermined angle relative to the direction of the free stream velocity (V) by the angle of axis 124 relative to the direction of the free stream velocity (V). Because the vortex generator 800 is deployed, the vortex generator 800 generates vortices (and accompanying drag) during low speed flight. As the airplane climbs in altitude and the free stream velocity (V) increases, the aerodynamic forces act on the vane 106 at cruising speed and wind up the spring 802 until the spring 802 is in force and moment equilibrium. This causes the vane 106 to rotate relative to the mount 804 and more closely align with the direction of the free stream velocity (V) in its retracted position. At this point the vortex generator 800 is substantially removed from the airflow of the free stream velocity (V) to minimize the amount of drag it produces. During approach to landing, the free stream velocity (V) decreases and the spring 802 contracts which causes the vane 106 to rotate in the opposite direction relative to the mount 804 to its deployed position, thereby generating vortices for landing.

The higher aerodynamic forces at cruising speed rotate the vane 106 to a smaller angle relative to the mount 104. The smaller angle reduces the aerodynamic forces on the vane 106 since the planform area relative to the free stream velocity (V) is smaller. The spring 802 provides an opposing torque that is high enough to resist the aerodynamically induced torque in low speed flight, and low enough to not resist the aerodynamically induced torque at cruising speed. The torque for the two bounds is set by defining the angle of the vane 106 relative to the free stream velocity (V) for the two flight conditions.

In this embodiment, the vane 106 generates similar lift and drag forces as in the first and second embodiments, but the rotation axis 124 of the vane 106 is parallel to the lifting surface 20, rather than perpendicular to it and the rotation axis 124 is oriented at some predetermined angle between 10-25 degrees relative to the direction of the free stream velocity. As the air flows against the leading edge 106c/outer surface 106e of the vane 106, the force component orthogonal to the vane 106 rotates the vane 106 into the cutout 864 in the plate 860. The vane 106, when retracted, can at least partially seat within the cutout 864. As such, the vane 106 lies deeper within the aerodynamic boundary layer, so the vane 106 is exposed to slower air flow on average than a vane 106 that sticks up perpendicular to the lifting surface 20 like the first through seventh embodiments. The vane 106 of this eighth embodiment therefore incurs less viscous drag.

Like that of the second embodiment, multiple springs can be used in this eighth embodiment.

Figure 9A:
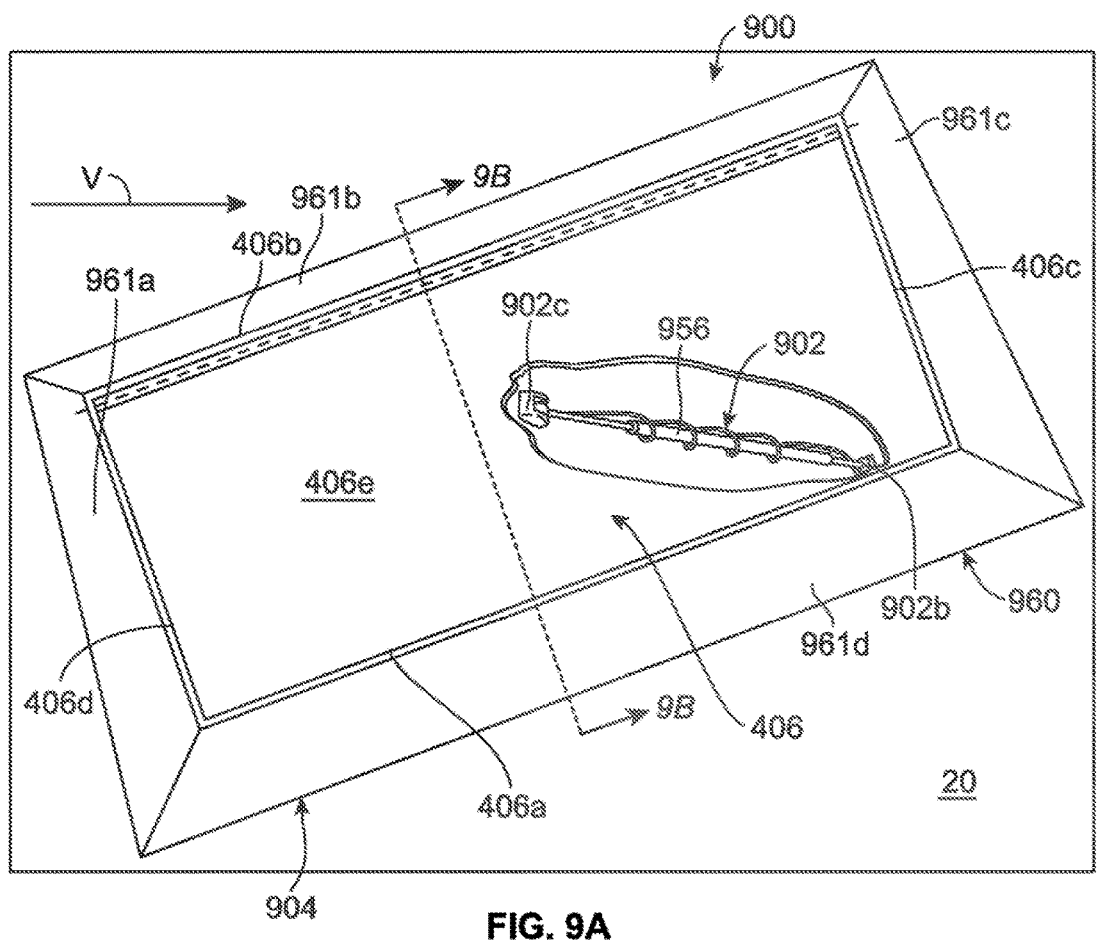
FIG. 9A is a perspective view of a ninth embodiment of a deployable vortex generator which incorporates the features of the present invention.
Figure 9B:
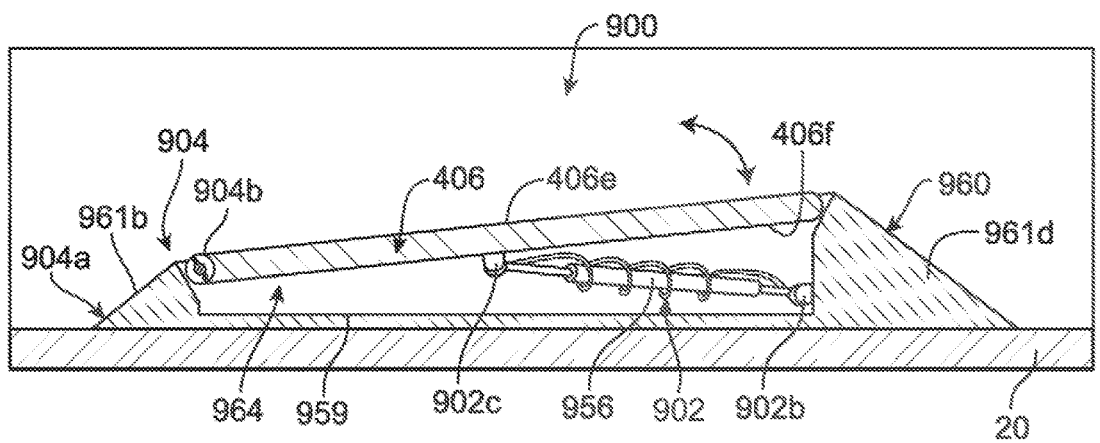
FIG. 9B is a cross-sectional view along line 9B-9B of FIG. 9A.
Figure 9C:
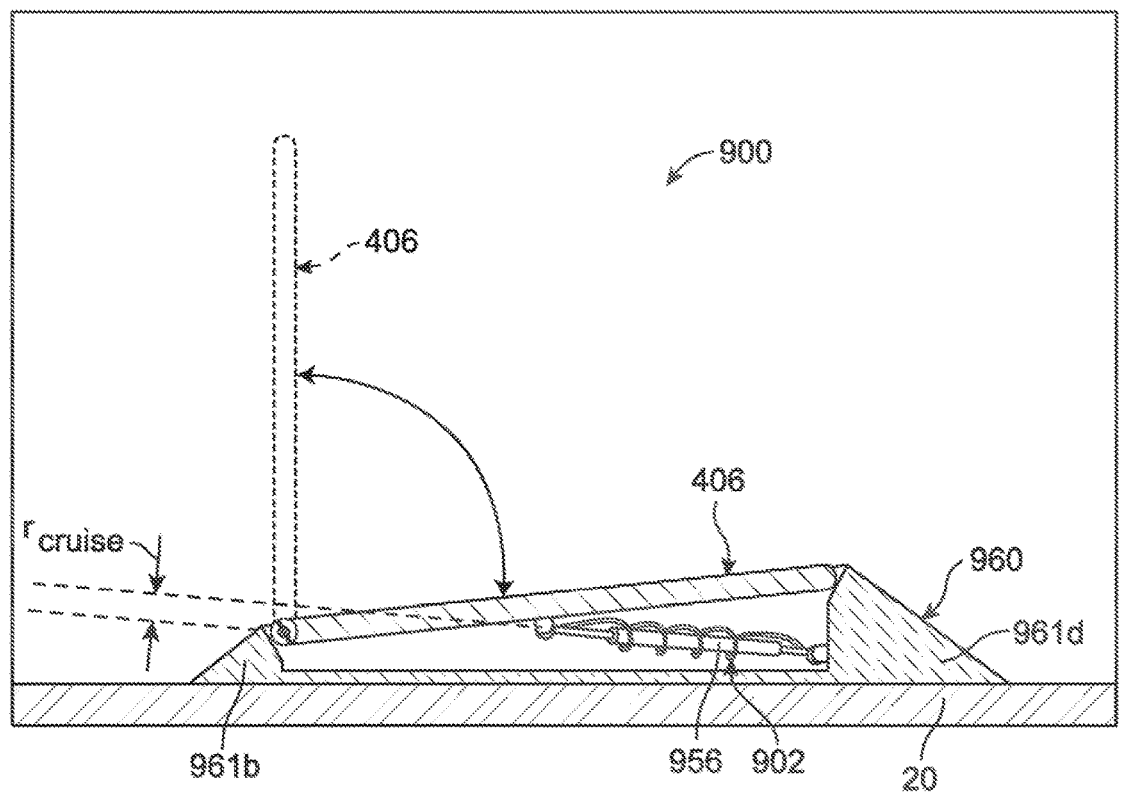
FIG. 9C is a cross-sectional view of the vortex generator of FIG. 9A showing the deployed position in broken line, and the retracted position in full line.

Attention is invited to FIGS. 9A-9C which show a ninth embodiment of the vortex generator 900. Like that of the eighth embodiment, the vortex generator 900 is formed of a two-part mount 904, the vane 406 attached to the mount 904, and a linear compression spring 902 connected between the mount 904 and the vane 406. The mount 904 includes a first part 904a which is attached to the lifting surface 20, and a second part 904b which is rotatably mounted in the first part 904a and attached to the vane 406.

The first part 904a of the mount 904 is formed from a plate 960 having a lower wall 959, and first, second, third and fourth walls 961a, 961a, 961c, 961d extending outwardly from the lower wall 959 and which form a recess 964 into which the vane 406 seats. The exteriors of the walls 961a, 961a, 961c, 961d define an outer surface of the plate 960. The first wall 961a defines a leading edge of the plate 960, and the third wall 961b defines a trailing edge of the plate 960. The walls 961a, 961a, 961c, 961d are beveled to reduce drag. The recess 964 conforms in shape to the vane 406 (as shown, both are rectangular). The first and third walls 961a, 961b include aligned openings therein in which the second part 904b of the mount 904 seats. The openings are parallel to the lifting surface 20. The lower wall 959 defines an inner surface of the plate 960, the lower wall 959 conforms to the shape of the lifting surface 20, and the lower wall 959 is attached to the lifting surface 20. The first part 904a of the mount 904 is made of suitable materials, such as metal, and the inner surface of the first part 904a is attached to the lifting surface 20 of the aircraft 21 by suitable means, such as welding.

The second part 904b of the mount 904 is formed from an elongated cylindrical pin. The ends of the second part 904b conform to the shape of the openings in the plate 960.

The vane 406 is identical to that of the fourth embodiment so the specifics are not repeated herein. The vane 406 is rotated relative to the position shown in the fourth embodiment, such that the edge 406d is the leading edge and the edge 406c is the trailing edge, and that surface 406e is an outer surface and surface 406f is an inner surface proximate to the lifting surface 20.

The linear compression spring 902 is conventional and has a main coil having an opening and opposite ends 902b, 902c. The spring 902 is mounted on a telescoping pin 956. The first end 902b of the spring 902 is secured to the mount 904 on the inside surface of the wall 961d (the surface proximate to the recess 964). The second end 902c of the spring 902 is secured to the inner surface 406f of the vane 406. When a force is exerted on the vane 406, the spring 502 expands to allow the vane 406 to rotate relative to the mount 404.

To assemble the vortex generator 100, the second part 904b is inserted through the bore of the vane 406 and the ends of the second part 904b seat into the aligned openings in the first and third walls 961a, 961b of the plate 960. The first end 902b of the spring 902 is secured to the mount 904 on the inside surface of the wall 961d, and the second end 902c of the spring 902 is secured to the inner surface 406f of the vane 406. This fixes the spring 902 into position. When a force is exerted on the vane 406, the spring 902 compresses and the telescoping pin 956 reduces its length.

The free stream velocity (V) during takeoff is less than the free stream velocity (V) at cruising speed. At takeoff, the vortex generator 900 is in its deployed position which is at some predetermined angle relative to the direction of the free stream velocity (V) as a result of the force of the spring 902. Because the vortex generator 900 is deployed, the vortex generator 900 generates vortices (and accompanying drag) during low speed flight. As the airplane climbs in altitude and the free stream velocity (V) increases, the aerodynamic forces act on the vane 406 at cruising speed and compress the spring 902 until the spring 902 is in force and moment equilibrium. This causes the vane 406 to rotate relative to the mount 904 and more closely align with the direction of the free stream velocity (V) in its retracted position. At this point the vortex generator 900 is substantially removed from the airflow of the free stream velocity (V) to minimize the amount of drag it produces. During approach to landing, the free stream velocity (V) decreases and the spring 902 expands which causes the vane 406 to rotate in the opposite direction relative to the mount 904 to its deployed position, thereby generating vortices for landing.

The higher aerodynamic forces at cruising speed rotate the vane 406 to a smaller angle relative to the plate 960. The smaller angle reduces the aerodynamic forces on the vane 406 since the planform area relative to the free stream velocity (V) is smaller. The spring 902 provides an opposing torque that is high enough to resist the aerodynamically induced torque in low speed flight, and low enough to not resist the aerodynamically induced torque at cruising speed. The torque for the two bounds is set by defining the angle of the vane 406 relative to the free stream velocity (V) for the two flight conditions.

In this embodiment, the vane 406 generates similar lift and drag forces as in the first and second embodiments, but the rotation axis 424 of the vane 406 is parallel to the lifting surface 20, rather than perpendicular to it and the rotation axis 424 is oriented at roughly 20° relative to the free stream velocity (V). As the air flows against the leading edge 436*d*/outer surface 406*e* of the vane 406, the force component orthogonal to the vane 406 rotates the vane 406 into the plate. The vane 406, when retracted, seats within the recess. As such, the vane 406 lies deeper within the aerodynamic boundary layer, so the vane 406 is exposed to slower air flow on average than a vane 406 that sticks up perpendicular to the lifting surface 20 like the first and second embodiments. The vane 406 of this ninth embodiment therefore incurs less viscous drag, like that of the eighth embodiment.

Multiple springs and telescoping pins can be used in this ninth embodiment.

In this embodiment, the spring 902 and its connections are hidden during flight at cruising speed, which minimizes drag. The beveled walls 961*a*, 961*b*, 961*c*, 961*d* of the plate 960 also reduces drag and protect the vane 406 and spring 902(*s*) from hail or high-speed bird strikes.

A flexure(s), like that shown in FIG. 7, can be attached to the plate 960 and to the vane 406 to replace the second part 904*b*.

In any of the embodiments of FIGS. 1A-9B, the leading edge of the mount and the leading edge of the vane may be contoured to minimize drag at cruising speed. In any of the embodiments of FIGS. 1A-9B, the rotational axis 124, 324, 424 of the vane 106, 306, 406 (e.g. the axis 124, 324, 424 about which the vane 106, 306, 406 is configured to rotate or pivot) may be as far forward toward the leading edge or as far aft of the leading edge as may be desirable for a particular application. In some examples, the rotational axis may be slightly aft of the leading edge (e.g., as in the example in FIG. 3), for example to reduce the spring force required to maintain the vane in the deployed position and/or reduce the air load needed to deflect the vane to the retracted position as described herein.

In the embodiments shown in FIGS. 10A-17C, vortex generators which are movable in response to a change in the atmospheric temperature are described. As will be appreciated, the atmospheric temperature during takeoff and/or approach to landing may be higher than the atmospheric temperature during cruise. In each embodiment shown in FIGS. 10A-17C, the vortex generator is formed from a vane or a plurality of stacked vanes attached to the lifting surface 20. The vane(s) acts on the airflow to create vortices. The vane(s) in the examples in FIGS. 10A-17C are formed from at least two layers of materials, with each material having a different coefficient of thermal expansion (CTE), resulting from either the type of materials used or the orientation of the material. The vane(s) is actuated, i.e. moved from a deployed position during takeoff/approach to landing to a retracted position during cruising, by strain from the material expansion/contraction due to temperature change. In the embodiments shown in FIGS. 10A-17C, during low speed flight, the vortex generator is in its deployed position which is at a predetermined angle relative to the direction of the free stream velocity (V). At cruising altitude, a change in the ambient conditions causes the vortex generator to move to a retracted position which is more closely aligned with the direction of the free stream velocity (V).

With regard to temperature induced curvature, the embodiments of the vortex generator shown in FIGS. 10A-17C use the temperature change which induces a change of curvature in the material of the vortex generator. With regard to stress/structural strength, the material curves because of internal strains that are a result of temperature change in two materials of differing coefficients of thermal expansion (CTE). These internal strains are coupled with respective stresses. In addition, the embodiments of the vortex generator shown in FIGS. 10A-24B are subject to bending loads from the airflow drag. This drag is superimposed on the temperature related stress from CTE mismatch.

In the following description regarding the embodiments of the vortex generator shown in FIGS. 10A-17C, a "firm bond" is defined as a bond that is permanent and not easily shearable. The firm bond may be formed by, for example, but not limited to, rivets, fasteners, glue, epoxy, diffusion bonding, clamped hardware. In the following description regarding the embodiments of the vortex generator shown in FIGS. 10A-17C, a "shear allowing bond" is defined as a bond which holds two components together, but allows relative movement between the components. The shear allowing bond may be formed by, for example, but not limited to, rubber RTV (adhesive or silicone), plastic.

Figure 10A:
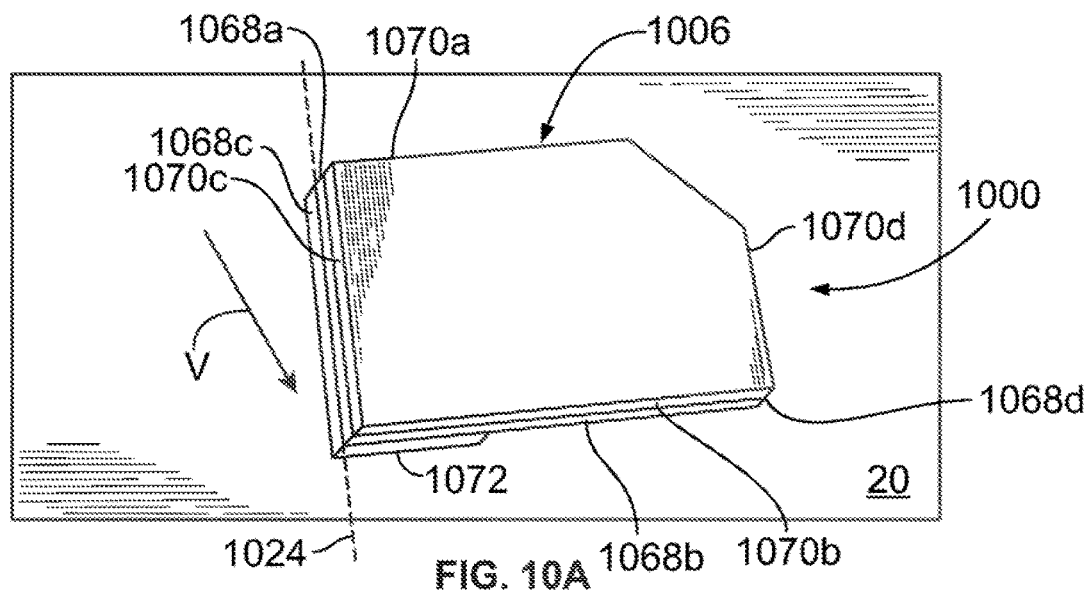
FIG. 10A is a perspective view of a tenth embodiment of a deployable vortex generator which incorporates the features of the present invention.
Figure 10B:
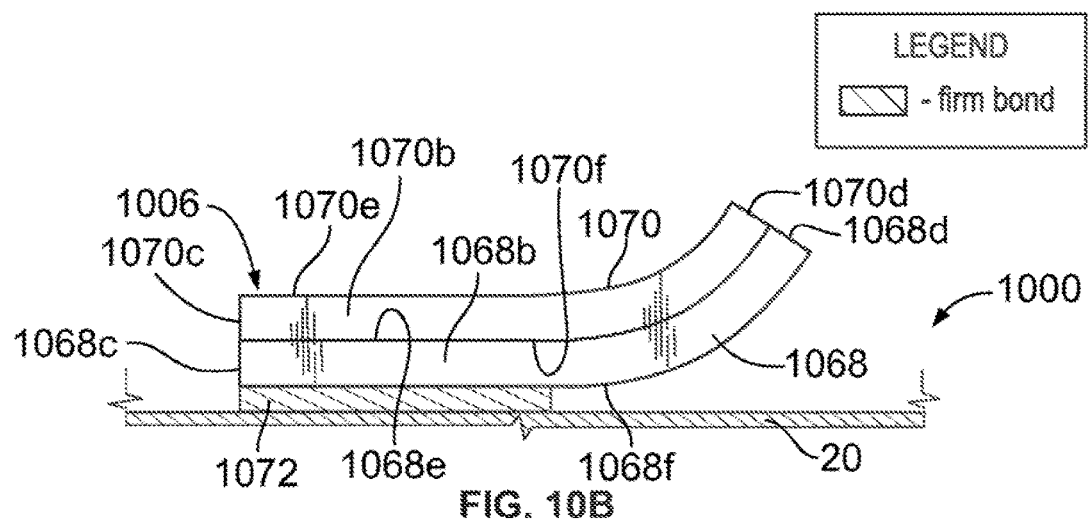
FIG. 10B is a side elevation view of the vortex generator of FIG. 10A in a deployed position.
Figure 10C:
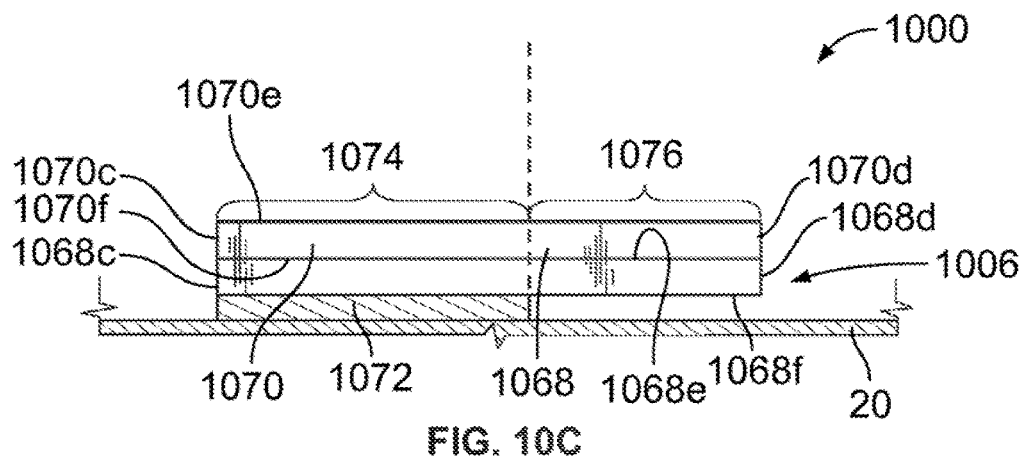
FIG. 10C is a side elevation view of the vortex generator of FIG. 10A in a retracted position.

Attention is invited the tenth embodiment of the vortex generator 1000 shown in FIGS. 10A-10C. The vortex generator 1000 is formed of a vane 1006 attached to the lifting surface 20 by a firm bond 1072 (the firm bond 1072 is shown exaggerated in the drawings).

The vane 1006 is formed of a first layer 1068 and a second layer 1070.

The first and second layers 1068, 1070 may be bonded together across the entire faying surface of the two layers 1068, 1070. The layers 1068, 1070 are generally rectangular and are planar when the vane 1006 is in a retracted position. The first layer 1068 has a leading edge 1068*a*, a trailing edge 1068*b*, opposite side edges 1068*c*, 1068*d*, a planar outer surface 1068*e*, and a planar opposite inner surface 1068*f* extending between the edges 1068*a*, 1068*b*, 1068*c*, 1068*d*. The outer surface 1068*e* forms the faying surface of the first layer 1068. The second layer 1070 has a leading edge 1070*a*, a trailing edge 1070*b*, opposite side edges 1070*c*, 1070*d*, a planar outer surface 1070*e*, and a planar opposite inner surface 1070*f* extending between the edges 1070*a*, 1070*b*, 1070*c*, 1070*d*. The inner surface 1070*f* forms the faying surface of the second layer 1070. The vane 1006 has a leading edge formed by edges 1068*a* and 1070*a*, a trailing edge formed by edges 1068*b* and 1070*b*, opposite side edges formed by edges 1068*c* and 1070*c*, 1068*d* and 1070*d*, an outer surface formed by surface 1070e, and an opposite inner surface formed by surface 1068f. An axis 1024 is defined along the side edge 1068c/1070c. The axis 1024 is oriented at roughly 20° relative to the direction of the free stream velocity (V).

The inner surface 1068f of the first layer 1068 is proximate to the lifting surface 20, and the second layer 1070 is separated from the lifting surface 20 by the first layer 1068.

The firm bond 1072 is provided between a first attachment portion 1074 of the inner surface 1068f and the lifting surface 20, and extends along the length of the side edge 1068c. A second portion 1076 of the inner surface 1068f remains unattached to the lifting surface 20.

The first layer 1068 is formed of a material which has a higher CTE than the material of which the second layer 1070 is formed.

At low speed flight, the vane 1006 is curved and is in its deployed position shown in FIG. 10B, and the temperature is greater than the temperature at cruising altitude. The second portion 1076 of the vane 1006 curves relative to the axis 1024 and forms a curve. The leading edge 1068a/1070a and the trailing edge 1068b/1070b and the portion of the vane 1006 therebetween curve, such that the second portion 1076 curves outwardly from the lifting surface 20. In this deployed position, the edge 1068d/1070d is positioned the furthest away from the lifting surface 20. The first portion 1074 remains attached to the lifting surface 20 as a result of the firm bond 1072. Because the vortex generator 1000 is deployed, the vortex generator 1000 generates vortices (and accompanying drag) during takeoff. As the airplane climbs in altitude and the temperature decreases, the second portion 1076 decreases in curvature until the second portion 1076 becomes substantially parallel to or flush with the exterior surface of the lifting surface 20 and the vortex generator 1000 is in its retracted position, as shown in FIG. 10C. Because the first layer 1068 is formed of a material which has a higher CTE than the material of which the second layer 1070 is formed, the vane 1006 straightens because of internal strains from the material expansion/contraction that are a result of temperature change in the two layers of materials having differing CTE. At this point the vortex generator 1000 is substantially removed from the airflow of the free stream velocity (V) to minimize the amount of drag it produces. During approach to landing, the air temperature rises and the second portion 1076 curves again moving the vane 1006 to its deployed position, generating vortices for landing.

Figure 11A:
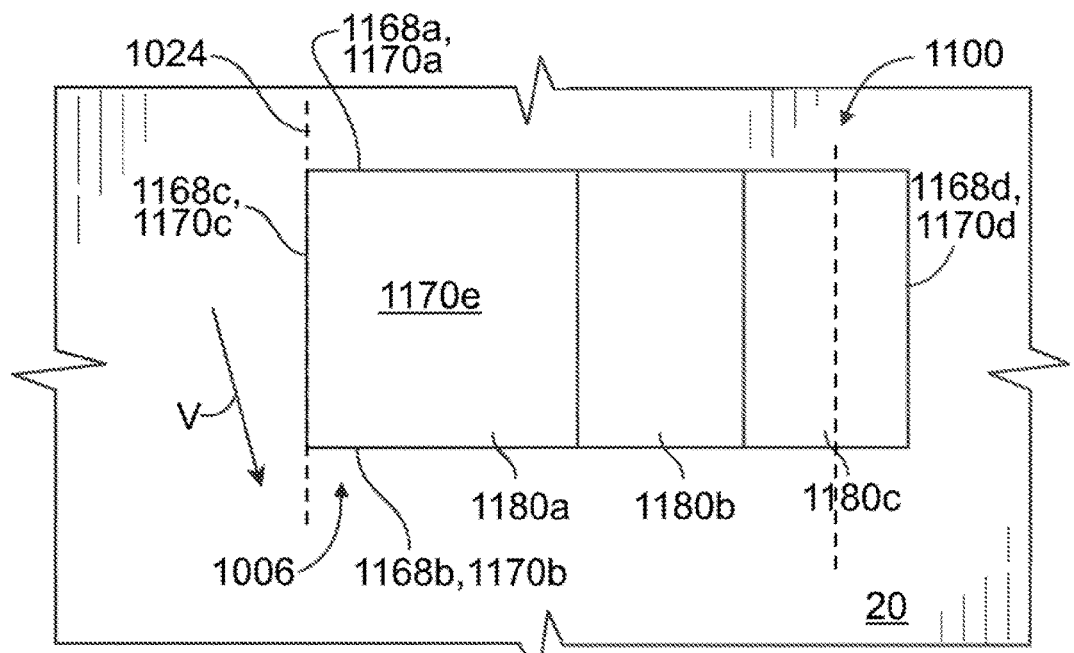
FIG. 11A is a top plan view of an eleventh embodiment of a deployable vortex generator which incorporates the features of the present invention.
Figure 11B:
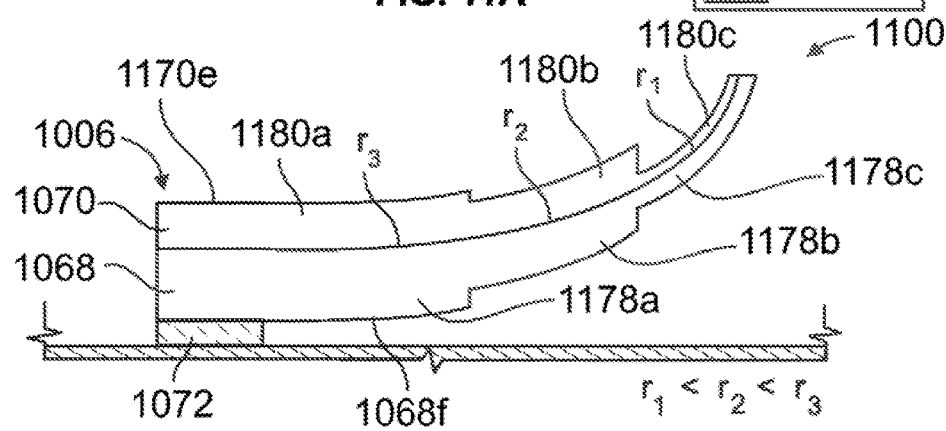
FIG. 11B is a side elevation view of the vortex generator of FIG. 11A in a deployed position.
Figure 11C:
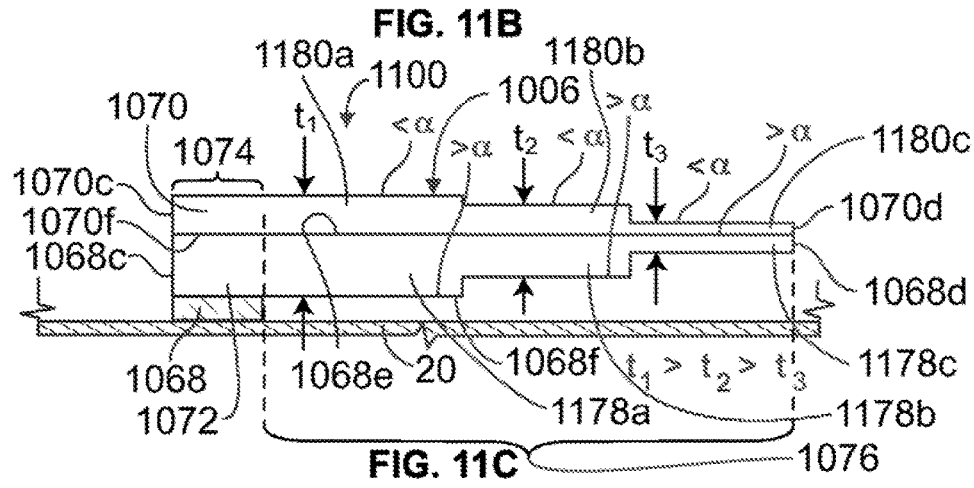
FIG. 11C is a side elevation view of the vortex generator of FIG. 11A in a retracted position.

FIGS. 11A-11C show an eleventh embodiment of the vortex generator 1100. The vortex generator 1100 is formed of a vane 1006 attached to the lifting surface 20 by a firm bond 1072 (the firm bond 1072 is shown exaggerated in the drawings).

The vane 1006 used in this embodiment is identical to the vane 1006 of the tenth embodiment, except for the differences noted herein. The vane 1006 of the previous embodiment has a planar outer surface 1070e and a planar inner surface 1068f when in the retracted position. In the present embodiment, the first layer 1068 has a planar outer surface 1068e (which is the faying surface) in the retracted position, but the first layer 1068 reduces in thickness as it progresses from its side edge 1068c to its side edge 1068d. As such, the inner surface 1068f of the first layer 1068 has a series of steps thereby forming a plurality of segments 1178a, 1178b, 1178c, each having a gradually reduced thickness relative to the segment leading into it. In the present embodiment, the second layer 1070 has a planar inner surface 1070f (which is the faying surface) in the retracted position, but the second layer 1070 reduces in thickness as it progresses from its side edge 1070c to its opposite side edge 1070d. As such, the outer surface 1070e of the second layer 1070 has a series of steps thereby forming a plurality of segments 1180a, 1180b, 1180c, each having a gradually reduced thickness relative to the segment leading into it. Segments 1178a and 1180a align with each other and are bonded together along their faying surfaces, segments 1178b and 1180b align with each other and are bonded together along their faying surfaces, and segments 1178c and 1180c align with each other and are bonded together along their faying surfaces. Three segments are shown in the drawings, however, it is to be understood that two segments or more than three segments may be provided. In some examples, the thickness of the layer may vary gradually and thus, alternatively, instead of being stepped, the inner surface 1068f and the outer surface 1070e may be tapered.

At low speed flight, the vane 1006 is curved and is in its deployed position shown in FIG. 11B, and the temperature is greater than the temperature at cruising altitude. The second portion 1076 of the vane 1006 curves relative to the axis 1024 and forms a curve. The leading edge 1068a/1070a, the trailing edge 1068b/1070b and the portion of the vane 1006 therebetween curve, such that the second portion 1076 curves outwardly from the lifting surface 20. Since segments 1178a/1180a, 1178b/1180b, 1178c/1180c are thinner as the vane 1006 progresses away from the attachment portion 1074, the segments 1178a/1180a, 1178b/1180b, 1178c/1180c may curve at different radii relative to each other, with the radii decreasing as the segments 1178a/1180a, 1178b/1180b, 1178c/1180c get thicker. In this deployed position, the edge 1068d/1070d is positioned the furthest away from the lifting surface 20. The first portion 1074 remains attached to the lifting surface 20 as a result of the firm bond 1072. Because the vortex generator 1100 is deployed, the vortex generator 1100 generates vortices (and accompanying drag) during takeoff. As the airplane climbs in altitude and the temperature decreases, the second portion 1076 decreases in curvature until the second portion 1076 becomes substantially parallel to or flush with the exterior surface of the lifting surface 20 and the vortex generator 1100 is in its retracted position, as shown in FIG. 11C. Because the first layer 1068 is formed of a material which has a higher CTE than the material of which the second layer 1070 is formed, the vane 1006 straightens because of internal strains from the material expansion/contraction that are a result of temperature change in the two layers of materials having differing CTE. At this point the vortex generator 1100 is substantially removed from the airflow of the free stream velocity (V) to minimize the amount of drag it produces. During approach to landing, the air temperature rises and the second portion 1074 curves again moving the vane 1006 to its deployed position, generating vortices for landing.

In this embodiment, the segments 1178a, 1180a closest to the attachment portion 1074 on the lifting surface 20 are the thickest. As the segments progress away from the attachment portion 1074, the segment thickness decreases to the thinnest segment 1178c, 1180c. Since the bending moment resulting from the airflow drag decreases the further away from the attachment portion 1074, the thinner material is able to withstand the applied load. As the segments get thinner, more curvature is produced at the same temperature difference. In this manner, the ease and/or amount of curvature achievable by the vane 1006 may be enhanced by the use of layers with varying thicknesses.

Figure 12A:
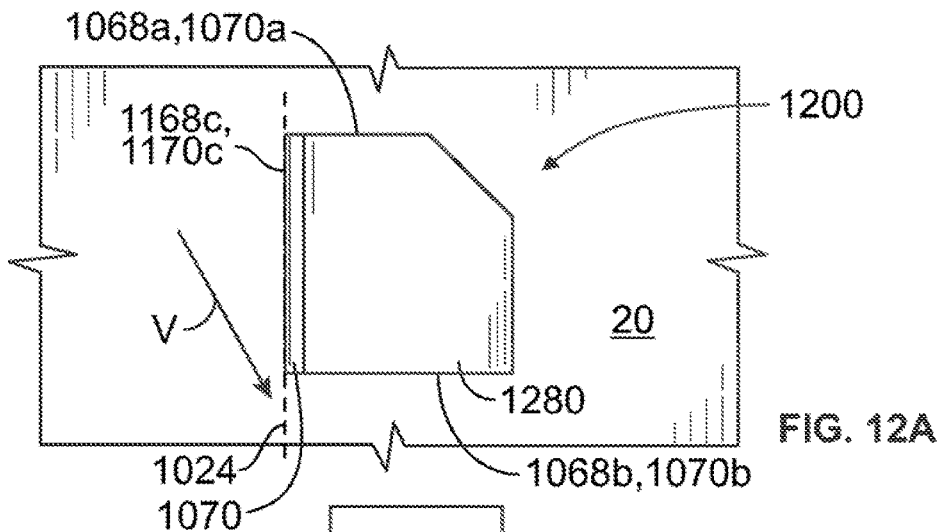
FIG. 12A is a top plan view of a twelfth embodiment of a deployable vortex generator which incorporates the features of the present invention.
Figure 12B:
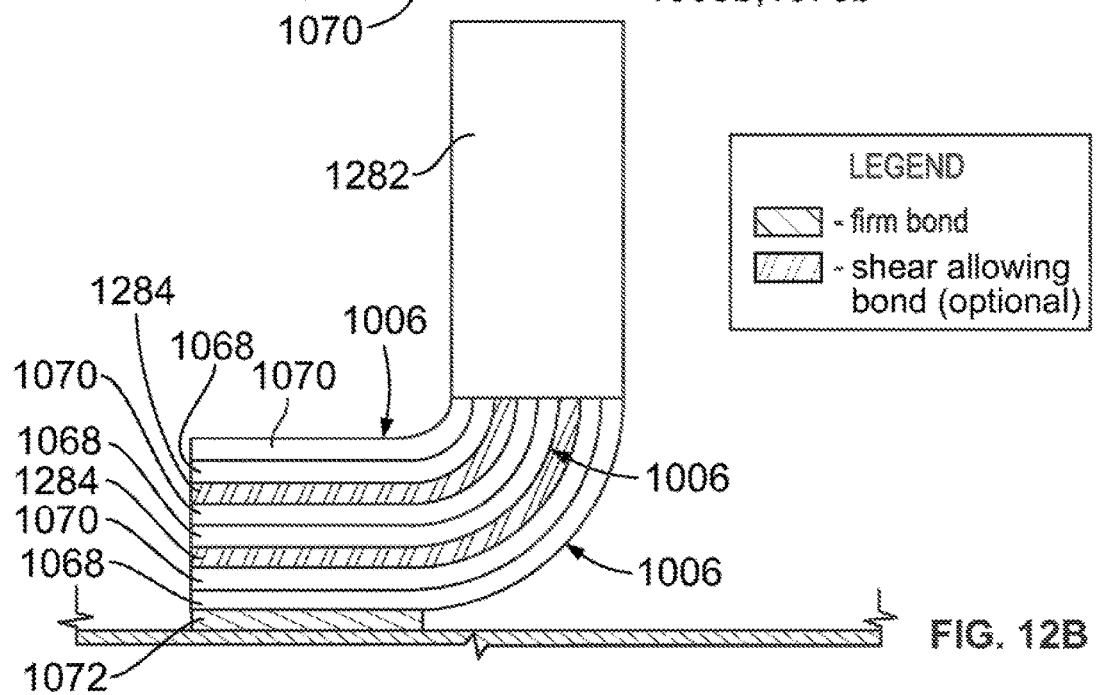
FIG. 12B is a side elevation view of the vortex generator of FIG. 12A in a deployed position.
Figure 12C:
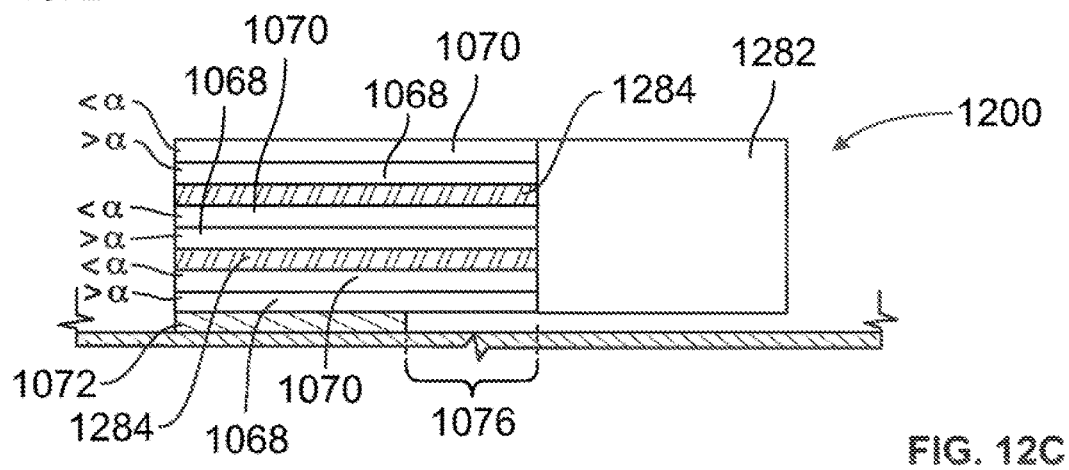
FIG. 12C is a side elevation view of the vortex generator of FIG. 12A in a retracted position.

FIGS. 12A-12C show a twelfth embodiment of the vortex generator 1200. The vortex generator 1200 is formed of a plurality of the vanes 1006 in a stacked arrangement having a monolayer vane portion 1282 attached to the end of the vanes 1006 at the sides edges 1068*d*, 1070*d* thereof by a firm bond. Each vane 1006 is thinner than the vane 1006 in the embodiment of FIGS. 10A-10C, for example, the overall thickness of the plurality of vanes 1006 in this embodiment may equal the thickness of the vane 1006 of the tenth embodiment. Each vane 1006 preferably has the same thickness. If desired, and as shown, a shear allowing layer 1284 can be provided between the vanes 1006. The shear allowing layer 1284 is optional, and instead the vanes 1006 can be proximate to each other. The innermost vane 1006 is attached to the lifting surface 20 by a firm bond 1072 (the shear allowing layers 1284 and the firm bond 1072 are shown exaggerated in the drawings) like that of the tenth embodiment.

At low speed flight, the vanes 1006 are curved and are in their deployed position shown in FIG. 12B, and the temperature is greater than the temperature at cruising altitude. The second portions 1076 of the vanes 1006 curve as described above. Because the vortex generator 1200 is deployed, the vortex generator 1200 generates vortices (and accompanying drag) during takeoff. As the airplane climbs in altitude and the temperature decreases, the second portions 1076 decrease in curvature until the second portions 1076 become substantially parallel to or flush with the exterior surface lifting surface 20 and the vortex generator 1200 is in its retracted position, as shown in FIG. 12C. Because each first layer 1068 is formed of a material which has a higher CTE than the material of which each second layer 1070 is formed, the vanes 1006 straighten because of internal strains from the material expansion/contraction that are a result of temperature change in the two layers of materials having differing CTE. At this point the vortex generator 1200 is substantially removed from the airflow of the free stream velocity (V) to minimize the amount of drag it produces. During approach to landing, the air temperature rises and the second portions 1076 curve again moving the vanes 1006 to their deployed position, generating vortices for landing.

The thin sheets which are used to form the plurality of vanes 1006 used in this embodiment produce more curvature under the same temperature differential as a thicker layer would produce. By stacking the thinner vanes 1006 with shear allowing layers 1284, the strength of several layers 1068, 1070 is combined to counter the drag forces. Thus, this embodiment can be as strong as a similarly sized two layer vortex generator, but produces greater curvature and deployment motion. This monolayer vane portion 1282 engages the airflow. In addition, vibrations imposed on the stacked vanes is dampened when the shear allowing layers 1284 absorbs energy through deformation in the shearing process thus dampening vibratory excitations.

As discussed above, the stacked vanes 1068, 1070 may be stacked without use of shear allowing layers 1284. The parallel vanes 1068, 1070 are either placed close together such that they rub against each other as curvature is generated or separated by a gap of space/air.

Figure 13A:
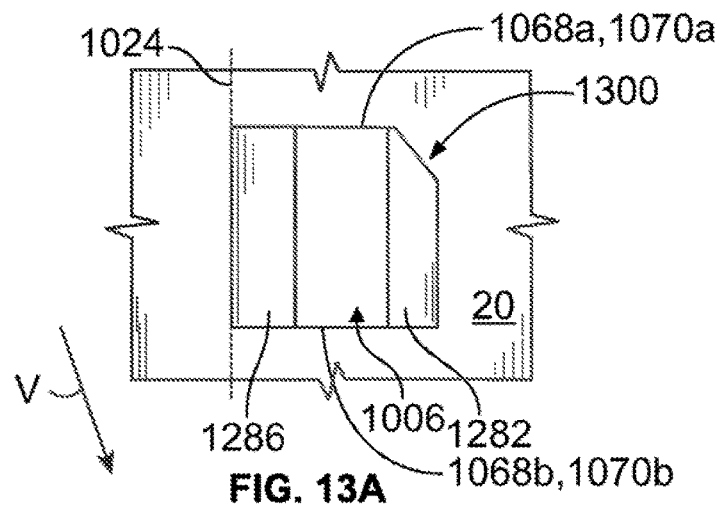
FIG. 13A is a top plan view of a thirteenth embodiment of a deployable vortex generator which incorporates the features of the present invention.
Figure 13B:
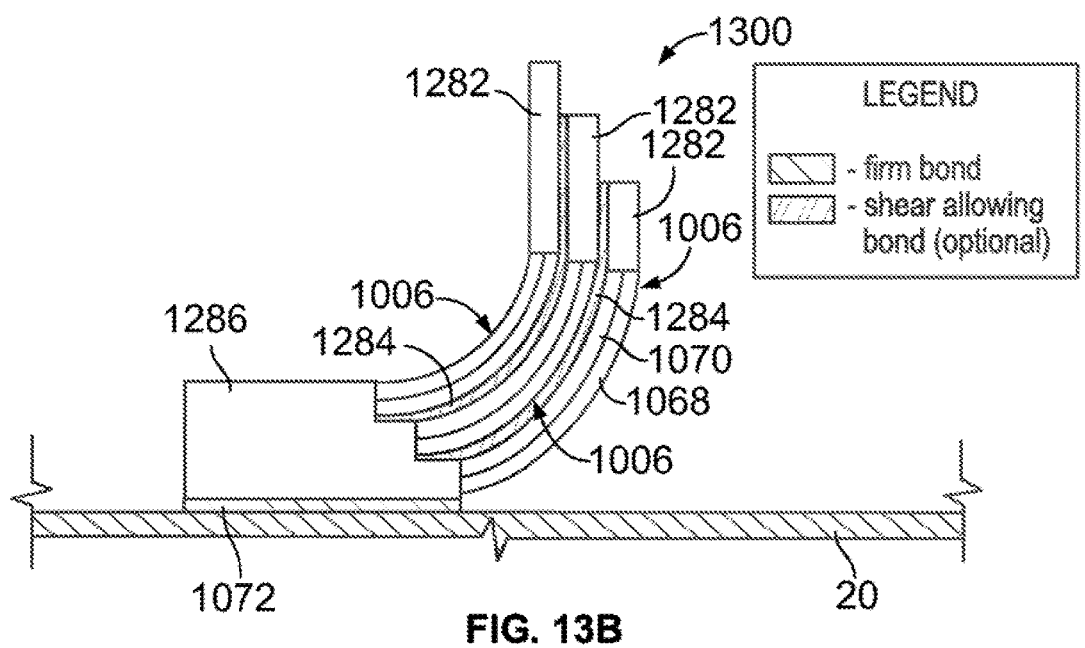
FIG. 13B is a side elevation view of the vortex generator of FIG. 13A in a deployed position.
Figure 13C:
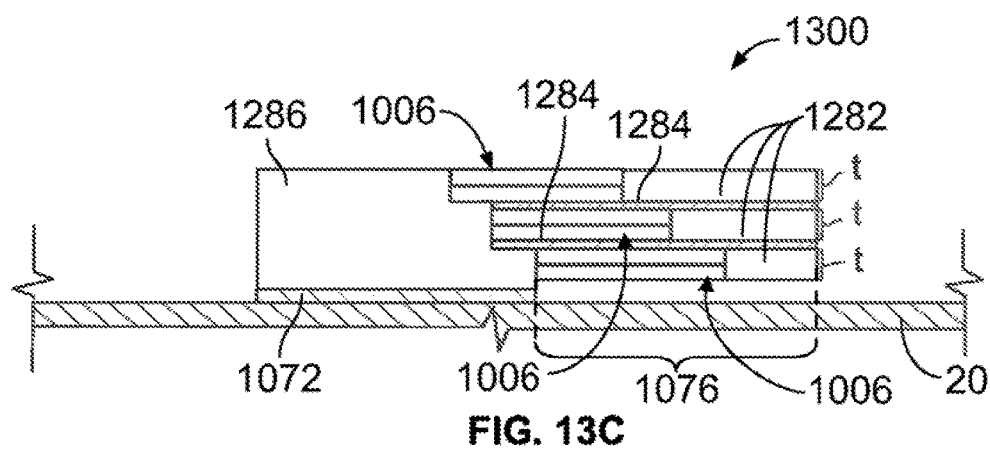
FIG. 13C is a side elevation view of the vortex generator of FIG. 13A in a retracted position.

FIGS. 13A-13C show a thirteenth embodiment of the vortex generator 1300. The vortex generator 1300 is formed of a plurality of the vanes 1006 in a stacked arrangement, having a single monolayer vane portion 1286 attached to the ends of the vanes 1006 proximate to the side edges 1068*c*, 1070*c* thereof by firm bonds, and a monolayer vane portion 1282 attached to the ends of the vanes 1006 proximate to the side edges 1068*d*, 1070*d* thereof by firm bonds. The vanes 1006 have the same length. The vanes 1006 preferably have the same thickness t. Each vane 1006 is thinner than the embodiment of FIGS. 10A-10C, for example, the overall thickness of the plurality of vanes 1006 in this embodiment may equal the thickness of the vane 1006 of the tenth embodiment. The monolayer vane portion 1282 may vary in length. If desired, and as shown, a shear allowing layer 1284 can be provided between the vanes 1006 and between the adjacent monolayer vane portions 1282. The shear allowing layer 1284 is optional, and instead the vanes 1006 can be proximate to each other. The monolayer vane portion 1286 is attached to the lifting surface 20 by a firm bond 1072 (the shear allowing layers 1284 and the firm bond 1072 are shown exaggerated in the drawings) like that of the tenth embodiment.

At low speed flight, the vanes 1006 are curved and are in their deployed position shown in FIG. 13B, and the temperature is greater than the temperature at cruising altitude. The second portions 1076 of the vanes 1006 curve as described above. Because the vortex generator 1300 is deployed, the vortex generator 1300 generates vortices (and accompanying drag) during takeoff. As the airplane climbs in altitude and the temperature decreases, the second portions 1076 decrease in curvature until the second portions 1076 become substantially parallel to or flush with the exterior surface of the lifting surface 20 and the vortex generator 1300 is in its retracted position, as shown in FIG. 13C. Because each first layer 1068 is formed of a material which has a higher CTE than the material of which each second layer 1070 is formed, the vanes 1006 straighten because of internal strains from the material expansion/contraction that are a result of temperature change in the two layers of materials having differing CTE. At this point the vortex generator 1300 is substantially removed from the airflow of the free stream velocity (V) to minimize the amount of drag it produces. During approach to landing, the air temperature rises and the second portions 1076 curve again moving the vanes 1006 to their deployed position, generating vortices for landing.

With this embodiment, since the vanes 1006 are separate from each other and not connected to each other at their side edges 1068*d*, 1070*d*, the vanes 1006 interact individually with the air stream, however, the vanes 1006 will share the total load. In the deployed position, the side edges 1068*d*, 1070*d* of the vanes 1006 are staggered. The vanes 1006 are preferably of equal thickness and will generate equal radii of curvature. The vanes 1006 are offset in horizontal placement to allow the curvatures to not negatively interfere through the total thickness.

Figure 14A:
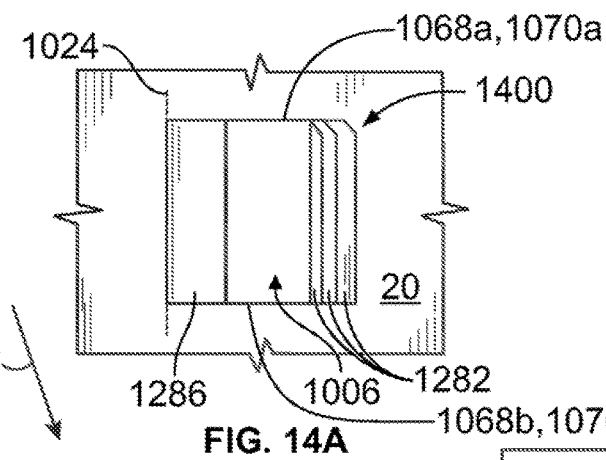
FIG. 14A is a top plan view of a fourteenth embodiment of a deployable vortex generator which incorporates the features of the present invention.
Figure 14B:
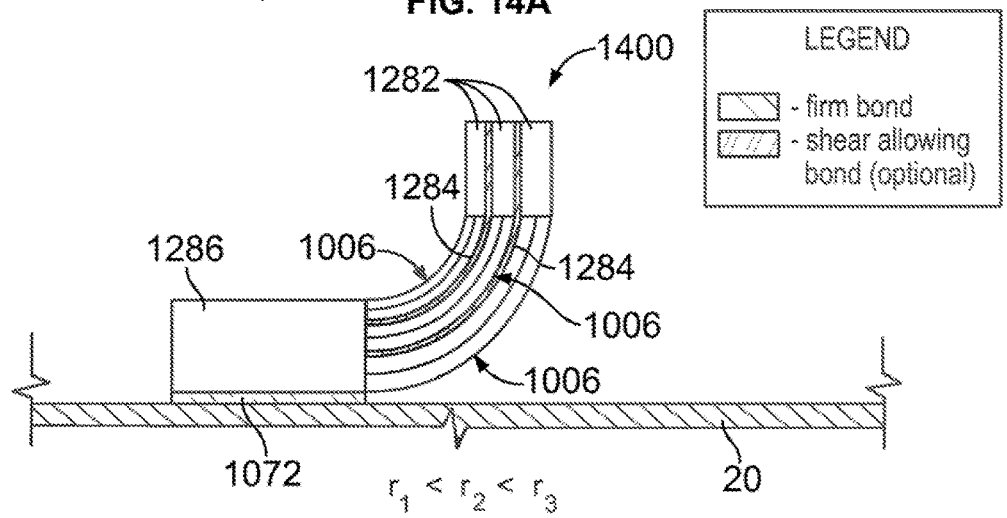
FIG. 14B is a side elevation view of the vortex generator of FIG. 14A in a deployed position.
Figure 14C:
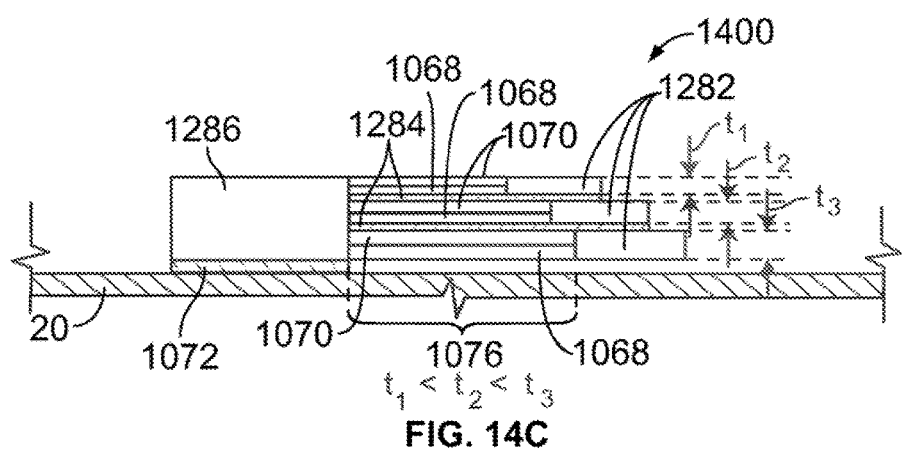
FIG. 14C is a side elevation view of the vortex generator of FIG. 14A in a retracted position.

FIGS. 14A-14C show a fourteenth embodiment of the vortex generator 1400. The vortex generator 1400 is formed of a plurality of the vanes 1006 in a stacked arrangement, having a single monolayer vane portion 1286 attached to the ends of the vanes 1006 proximate to the side edges 1068*c*, 1070*c* thereof by firm bonds, and a monolayer vane portion 1282 attached to the ends of the vanes 1006 proximate to the side edges 1068*d*, 1070*d* thereof by firm bonds. The vanes 1006 have differing lengths, with the innermost vane 1006 (the one closest to the lifting surface 20) being the longest, and the vanes 1006 becoming progressively shorter moving outwardly. In addition, the vanes 1006 and the monolayer vane portion 1286 have differing thicknesses, with the innermost vane 1006 (the one closest to the lifting surface 20) being the thickest having a thickness t, and the vanes 1006 becoming progressively thinner moving outwardly. Each vane 1006 is thinner than the embodiment of FIGS.

10A-10C, for example, the overall thickness of the plurality of vanes 1006 in this embodiment may equal the thickness of the single vane 1006 of the tenth embodiment. If desired, and as shown, a shear allowing layer 1284 can be provided between the vanes 1006 and between the adjacent monolayer vane portions 1282. The shear allowing layer 1284 is optional, and instead the vanes 1006 can be proximate to each other. The lowermost vane 1006 is attached to the lifting surface 20 by a firm bond 1072 (the shear allowing layers 1284 and the firm bond 1072 are shown exaggerated in the drawings).

At low speed flight, the vanes 1006 are curved and are in their deployed position shown in FIG. 14B, and the temperature is greater than the temperature at cruising altitude. The second portions 1076 of the vanes 1006 curve as described above. Because the vortex generator 1400 is deployed, the vortex generator 1400 generates vortices (and accompanying drag) during takeoff. As the airplane climbs in altitude and the temperature decreases, the second portions 1076 decrease in curvature until the second portions 1076 become substantially parallel to or flush with the exterior surface of the lifting surface 20 and the vortex generator 1400 is in its retracted position, as shown in FIG. 14C. Because each first layer 1068 is formed of a material which has a higher CTE than the material of which each second layer 1070 is formed, the vanes 1006 straighten because of internal strains from the material expansion/contraction that are a result of temperature change in the two layers of materials having differing CTE. At this point the vortex generator 1400 is substantially removed from the airflow of the free stream velocity (V) to minimize the amount of drag it produces. During approach to landing, the air temperature rises and the second portions 1076 curve again moving the vanes 1006 to their deployed position, generating vortices for landing.

With this embodiment, since the vanes 1006 are separate from each other and not connected to each other at their side edges 1068d, 1070d, the vanes 1006 interact individually with the air stream, however, the vanes 1006 will share the total load. In the deployed position, the side edges 1068d, 1070d of the vanes 1006 align with each other.

Since the thicknesses of the vanes 1006 vary from thinnest on the concave side to thickest on the convex side, this allows the generated curvature of each vane 1006 to match with adjacent vanes 1006 through the total thickness. In addition, since the vanes 1006 vary in length, this allows the height of the vanes 1006 to match when curved. This allows each vane to share equal amounts of load from the airstream, and not negatively interfere through the total thickness.

Figure 15A:
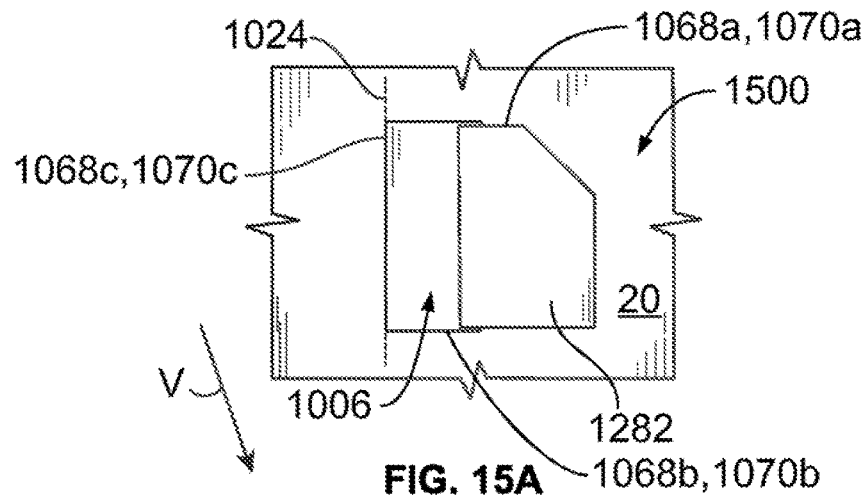
FIG. 15A is a top plan view of a fifteenth embodiment of a deployable vortex generator which incorporates the features of the present invention.
Figure 15B:
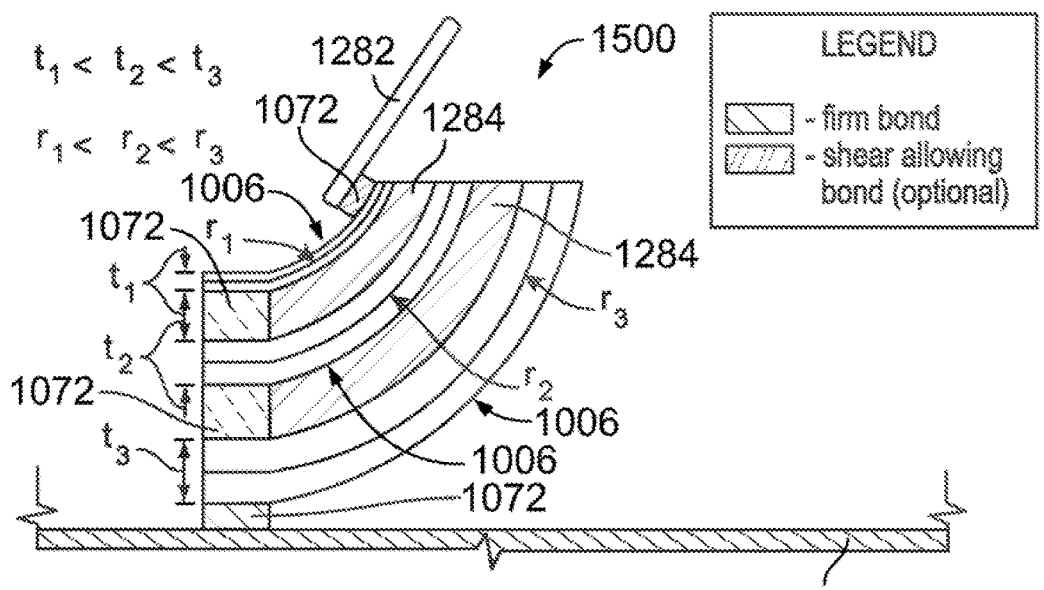
FIG. 15B is a side elevation view of the vortex generator of FIG. 15A in a deployed position.
Figure 15C:
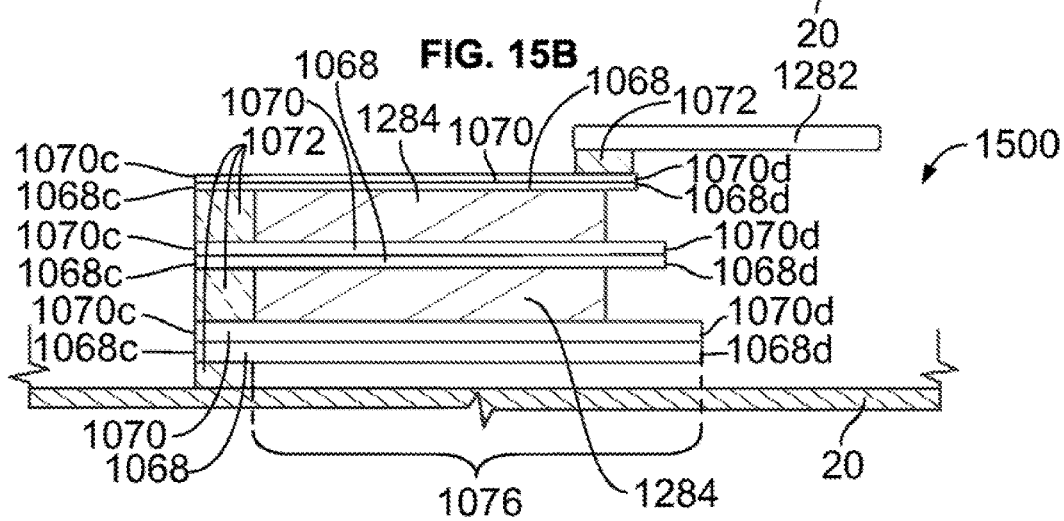
FIG. 15C is a side elevation view of the vortex generator of FIG. 15A in a retracted position.

FIGS. 15A-15C show a fifteenth embodiment of the vortex generator 1500. The vortex generator 1500 is formed of a plurality of the vanes 1006 in a stacked arrangement, having a firm bond 1072 (the firm bond 1072 is shown exaggerated in the drawings) between the adjacent vanes 1006 proximate to the side edge 1068c, 1070c, and a monolayer vane portion 1282 attached to the outer surface 1070e of the outermost vane 1006 proximate to the edge 1070d. The vanes 1006 have differing lengths, with the innermost vane 1006 (the one closest to the lifting surface 20) being the longest, and the vanes 1006 becoming progressively shorter moving outwardly. In addition, the vanes 1006 have differing thicknesses, with the innermost vane 1006 (the one closest to the lifting surface 20) being the thickest having a thickness t, and the vanes 1006 becoming progressively thinner moving outwardly. Each vane 1006 is thinner than the embodiment of FIGS. 10A-10C, for example, the overall thickness of the plurality of vanes 1006 in this embodiment may equal the thickness of the single vane 1006 of the tenth embodiment. If desired, and as shown, a shear allowing layer 1284 can be provided between the vanes 1006 proximate to the firm bonds 1072. The shear allowing layers 1284 are optional, and instead the vanes 1006 can be proximate to each other. The innermost vane 1006 is attached to the lifting surface 20 by a firm bond 1072 like that of the tenth embodiment.

At low speed flight, the vanes 1006 are curved and are in their deployed position shown in FIG. 15B, and the temperature is greater than the temperature at cruising altitude. The second portions 1076 of the vanes 1006 curve as described above. Because the vortex generator 1500 is deployed, the vortex generator 1500 generates vortices (and accompanying drag) during takeoff. As the airplane climbs in altitude and the temperature decreases, the second portions 1076 decrease in curvature until the second portions 1076 become substantially parallel to or flush with the exterior surface of the lifting surface 20 and the vortex generator 1500 is in its retracted position, as shown in FIG. 15C. Because each first layer 1068 is formed of a material which has a higher CTE than the material of which each second layer 1070 is formed, the vanes 1006 straighten because of internal strains from the material expansion/contraction that are a result of temperature change in the two layers of materials having differing CTE. At this point the vortex generator 1500 is substantially removed from the airflow of the free stream velocity (V) to minimize the amount of drag it produces. During approach to landing, the air temperature rises and the second portions 1076 curve again moving the vanes 1006 to their deployed position, generating vortices for landing.

With this embodiment, since the vanes 1006 are separate from each other and not connected to each other at their side edges 1068d, 1070d, the vanes 1006 interact individually with the air stream, however, the vanes 1006 will share the total load. In the deployed position, the side edges 1068d, 1070d of the vanes 1006 align with each other. The vanes 1006 are offset in horizontal placement to allow the curvatures to not negatively interfere through the total thickness.

The monolayer vane portion 1282 is not bonded/in contact with all of the vanes 1006. Since the monolayer vane portion 1282 is only bonded to the outermost vane 1006, this allows free motion between the vanes 1006.

Figure 16A:
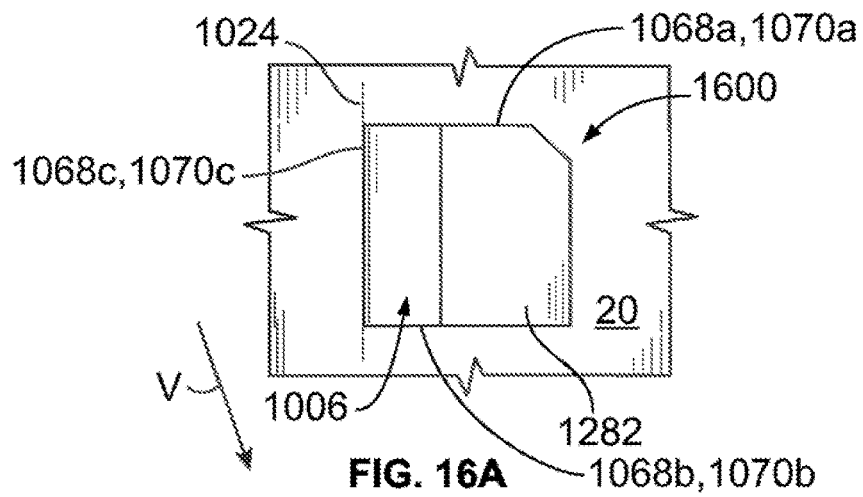
FIG. 16A is a top plan view of a sixteenth embodiment of a deployable vortex generator which incorporates the features of the present invention.
Figure 16B:
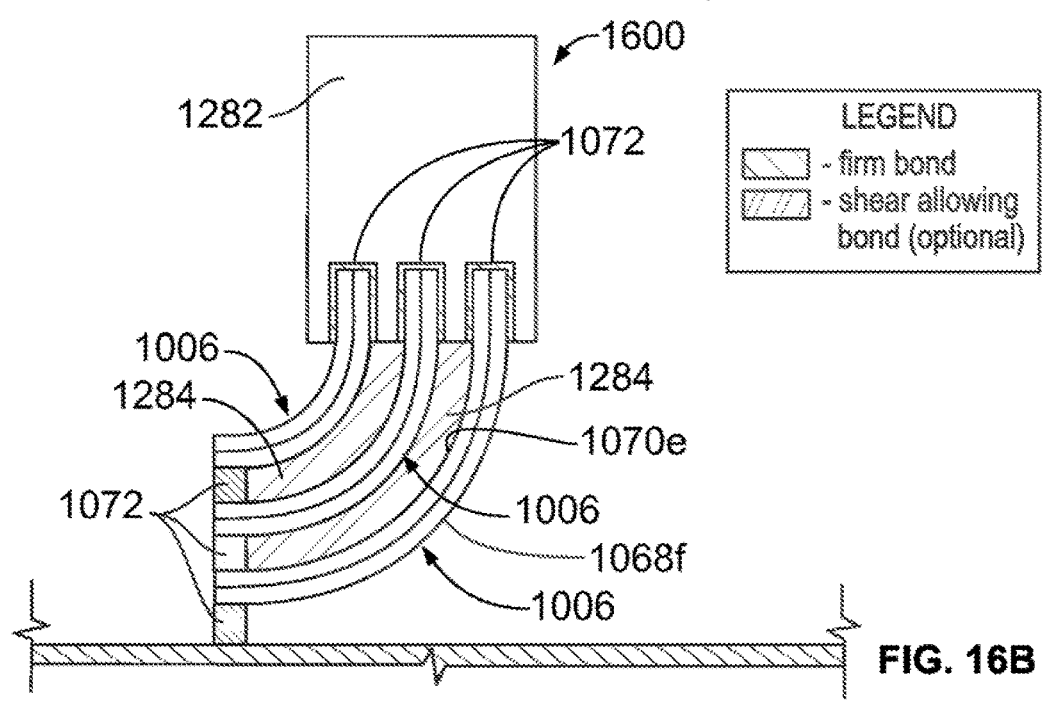
FIG. 16B is a side elevation view of the vortex generator of FIG. 16A in a deployed position.
Figure 16C:
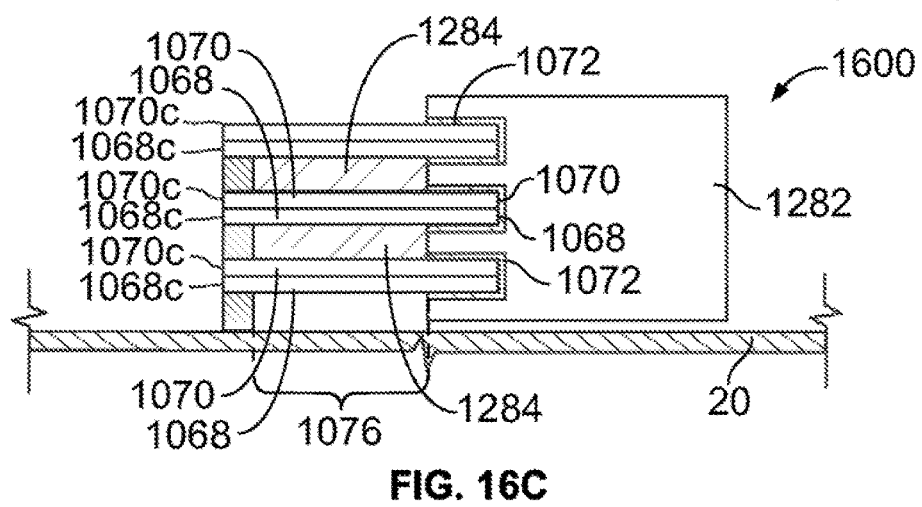
FIG. 16C is a side elevation view of the vortex generator of FIG. 16A in a retracted position.

FIGS. 16A-16C show a sixteenth embodiment of the vortex generator 1600. The vortex generator 1600 is formed of a plurality of the vanes 1006 in a stacked arrangement, having a firm bond 1072 between the adjacent vanes 1006 at the ends proximate to the side edge 1068c, 1070c, and a monolayer vane portion 1282 attached to the vanes 1006 at the ends proximate to the edges 1068d, 1070d by firm bonds 1072 (the firm bonds 1072 are shown exaggerated in the drawings). The vanes 1006 have the same lengths and thicknesses (although the thicknesses may vary like that of the fourteenth embodiment of the vortex generator 1400). Each vane 1006 is thinner than the embodiment of FIGS. 10A-10C, for example, the overall thickness of the plurality of vanes 1006 in this embodiment may equal the thickness of the single vane 1006 of the tenth embodiment. If desired, and as shown, a shear allowing layer 1284 can be provided between the vanes 1006, and between the firm bonds 1072 and the monolayer vane portion 1282. The shear allowing layers 1284 are optional, and instead the vanes 1006 can be proximate to each other. The innermost vane 1006 is attached to the lifting surface 20 by a firm bond 1072 like that of the tenth embodiment.

At low speed flight, the vanes 1006 are curved and are in their deployed position shown in FIG. 16B, and the temperature is greater than the temperature at cruising altitude. The second portions 1076 of the vanes 1006 curve as described above. Because the vortex generator 1600 is deployed, the vortex generator 1600 generates vortices (and accompanying drag) during takeoff. As the airplane climbs in altitude and the temperature decreases, the second portions 1076 decrease in curvature until the second portions 1076 become substantially parallel to or flush with the exterior surface of the lifting surface 20 and the vortex generator 1600 is in its retracted position, as shown in FIG. 16C. Because each first layer 1068 is formed of a material which has a higher CTE than the material of which each outer layer 1070 is formed, the vanes 1006 straighten because of internal strains from the material expansion/contraction that are a result of temperature change in the two layers of materials having differing CTE. At this point the vortex generator 1600 is substantially removed from the airflow of the free stream velocity (V) to minimize the amount of drag it produces. During approach to landing, the air temperature rises and the second portions 1076 curve again moving the vanes 1006 to their deployed position, generating vortices for landing.

FIGS. 17A-17C show a seventeenth embodiment of the vortex generator 1700. The vortex generator 1700 is identical to the sixteenth embodiment of the vortex generator 1600, except for the differences noted herein. In the vortex generator 1600, firm bonds 1072 attach the monolayer vane portion 1282 to the ends of the vanes 1006 at the edges 1068d, 1070d thereof. In this embodiment, the outermost vane 1006 is attached to the monolayer vane portion 1282 by a firm bond 1072, but the remaining vanes 1006 are attached to the monolayer vane portion 1282 by movable joints 1790, such as roller bearing, or TEFLON-coated/lubricated sliding joints. In the vortex generator 1600, the vanes 1006 have the same thickness. In this embodiment, the vanes 1006 vary in thickness like that of the fourteenth embodiment of the vortex generator 1400. The innermost vane 1006 (the one closest to the lifting surface 20) is the thickest having a thickness t, and the vanes 1006 become progressively thinner moving outwardly. This allows the generated curvature of each vane 1006 to match with adjacent vanes 1006 through the total thickness.

In each of the embodiments of FIGS. 10A-17C, in an embodiment, the vane is bimetallic and the first layer is formed of aluminum and the outer layer is formed of titanium. Other metals may be used. The layers are diffusion bonded across the complete faying surface of the two layers. In each of the embodiments of FIGS. 10A-17C, in another embodiment, the first layer is formed of a glass fiber composite having the glass fibers running in a first direction which is parallel to the edge and the length of the firm bond, and the second layer is formed of a carbon fiber composite having the glass fibers running in a second direction which is transverse to the first direction, i.e. parallel to the leading edge. Because the glass fibers run parallel to the length of the firm bond (and parallel to the axis curvature) in the first layer, the first layer has a higher CTE in the direction of side edge "b". Because the carbon fibers run transverse to the length of the firm bond (and transverse to the axis of curvature) in the second layer, the second layer has a lower CTE in the direction of side edge "b". The directionality of the fiber composites decouples the thermal expansion rates between the two materials.

In each embodiment of the vortex generator shown in FIGS. 10A-17C, an axis 1024 is defined along the side edges 1068c, 1070c of the vane(s). The axis 1024 is oriented at roughly 20° relative to the direction of the free stream velocity (V) in each embodiment.

Figure 18:
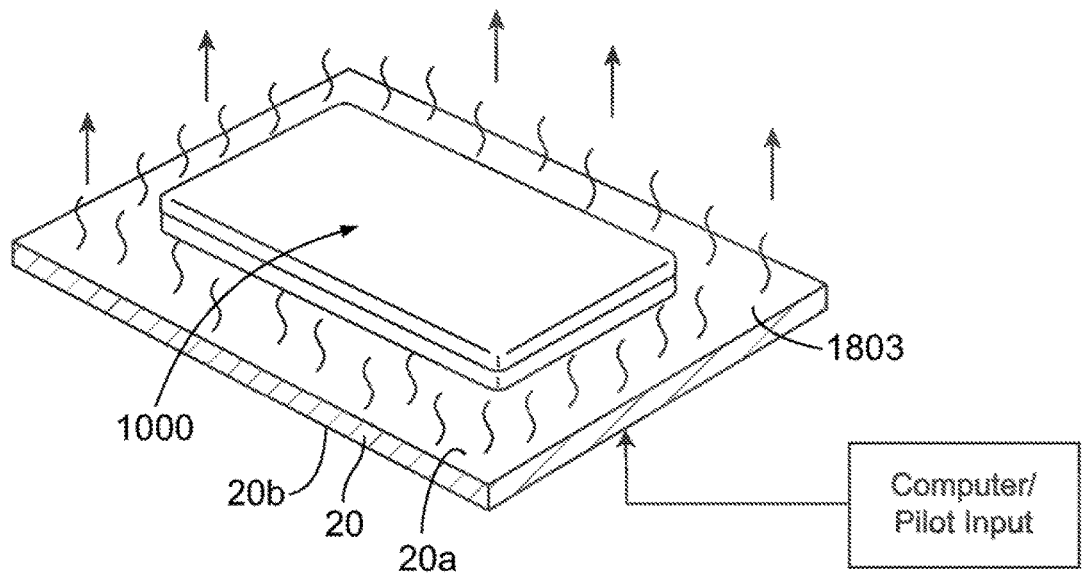
FIG. 18 is a perspective view of a modification which can used in any of the embodiments of the vortex generators shown in FIGS. 10A-17C, and in the embodiments of FIGS. 20A-23C.

FIG. 18 shows a modification that can be made to any of the embodiments of the vortex generators shown in FIGS. 10A-17C and 20A-23D. For example purposes only, the vortex generator is shown as vortex generator 1000 in FIG. 18. The modification provides a heating element 1803 proximate to the vortex generator 1000. The heating element 1803 is controlled by the flight computer/pilot such that the vortex generator 1000 can be heated and deployed when needed, regardless of external temperature. As shown in FIG. 18, an electric heater is provided as the heating element 1803. Bleed air from the engines may also be provided as the heating elements 1803. The heating element 1803 may be surface mounted on the exterior surface 20a of the lifting surface 20, or may be underneath the lifting the surface 20 proximate to the inner surface 20b of the lifting surface 20, or may be built into the vane of the vortex generator shown in FIGS. 10A-17C and 20A-23D.

Figure 19:
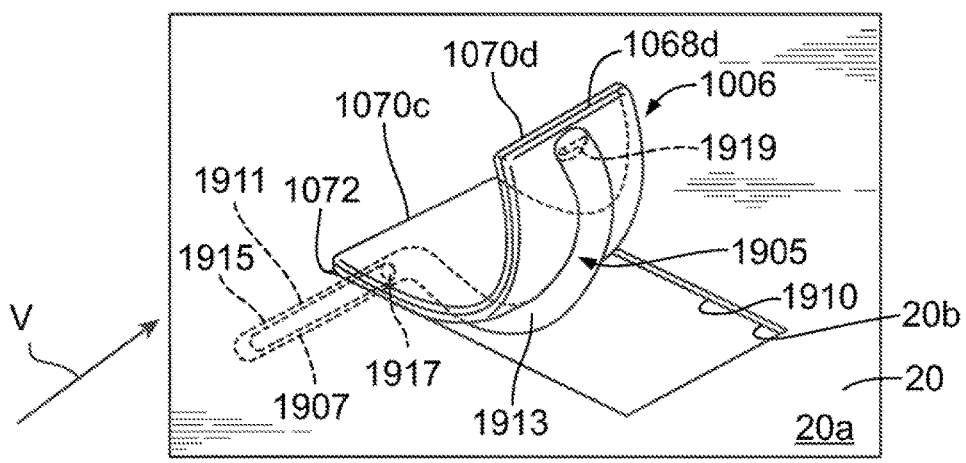
FIG. 19 is a perspective view of a modification which can used in any of the embodiments of the vortex generators shown in FIGS. 10A-17C.

FIG. 19 shows another modification than can be made to any of the embodiments of the vortex generators shown in FIGS. 10A-17C. A rigid stop 1905 is attached to a fixed point below the interior surface 20b of the lifting surface 20 (for example on a spar of the wing of the airplane) and to the vane(s) 1006. The rigid stop 1905 limits the amount of movement of the vane(s) 1006 relative to the lifting surface 20. The firm bond 1072 is provided proximate to an opening 1910 in the lifting surface 20 and the rigid stop 1905 passes through this opening 1910 during operation.

The rigid stop 1905 is formed of an arm 1907 having a first elongated portion 1911 and a second curved portion 1913. The elongated portion 1911 has an elongated slot 1915 extending along the length of the portion 1911. A pin 1917 is attached to the fixed point below the interior surface 20b of the lifting surface 20, and seats in the slot 1915. The free end of the curved portion 1913 is pivotally attached to the innermost vane 1006 proximate to the ends 1068d, 1070d at a hinge 1919. The arm 1907 can pivot around the fixed pin 1917 and translate relative to the fixed pin 1917. In addition, the arm 1907 can pivot relative to the vane(s) 1006 at hinge 1919. During this motion, the pin 1917 rides in the slot 1915 as the elongated portion 1911 moves relative to the pin 1917. The arm 1907 cants as a result of this pivoting movement around the pin 1917, causing the free end of the arm 1907 to pass through the opening 1910 and to rotate outwardly from the lifting surface 20.

The vane(s) 1006 curve and seat within the curved portion 1913 of the arm 1907. As the vane(s) 1006 curves, the curvature of the vane(s) 1006 approaches the curvature of the curved portion 1913. Once the curvature of the vane(s) 1006 matches the curvature of the curved portion 1913, the vane(s) 1006 and curved portion 1913 contact each other and prevent further curving of the vane(s) 1006. This prevents further curvature of the vane(s) 1006 from developing once the designed limit is reached.

Attention is now invited to the embodiments of the vortex generator 2000, 2100, 2200 shown in FIGS. 20A-22C. In the embodiments of the vortex generators 2000, 2100, 2200 shown in FIGS. 20A-22C, the ambient conditions are the change in atmospheric temperature from that of takeoff and approach to landing (when the temperatures are higher) and that of cruising (when the temperatures are lower). In each embodiment, the vortex generator 2000, 2100, 2200 is formed from a vane 2011 having an end 2011c rotatably attached to an exterior surface 20a of the lifting surface 20 at a hinge 2013. The vane 2011 is moved between a deployed position during takeoff/approach to landing and a retracted position during cruising by an actuator 2015, 2115, 2215. The vane 2011 is planar and generally rectangular having a leading edge 2011a, a trailing edge 2011b, opposite side edges 2011c, 2011d, a planar outer surface 2011e, and a planar opposite inner surface 2011f extending between the edges 2011a, 2011b, 2011c, 2011d. The vane 2011 is formed of a solid material. The hinge 2013 extends along edge 2011c and defines an axis 2017. The axis 2017 is oriented at roughly 20° relative to the direction of the free stream velocity (V). The vane 2011 acts on the airflow to create vortices.

The actuator 2015, 2115, 2215 is formed from at least two different materials, with each material having a different coefficient of thermal expansion (CTE). During low speed flight, the vortex generator 2000, 2100, 2200 is in its deployed position which is at a predetermined angle relative to the direction of the free stream velocity (V). During cruising, the ambient conditions cause the vortex generator 2000, 2100, 2200 to move to a retracted position which is more closely aligned with the direction of the free stream velocity (V).

With regard to temperature induced curvature, the embodiments of the vortex generator 2000, 2100, 2200 shown in FIGS. 20A-22C use the temperature change which induces a change of shape in the material of the actuator 2015, 2115, 2215. With regard to stress/structural strength for the embodiments shown in FIGS. 20A-21C, the material of the actuator 2015, 2115 curves because of internal strains that are a result of temperature change in two materials of differing coefficients of thermal expansion (CTE). These internal strains are coupled with respective stresses. In addition, the embodiments of the vortex generator shown in FIGS. 20A-22C are subject to bending loads from the airflow drag. This drag is superimposed on the temperature related stress.

Figure 20A:
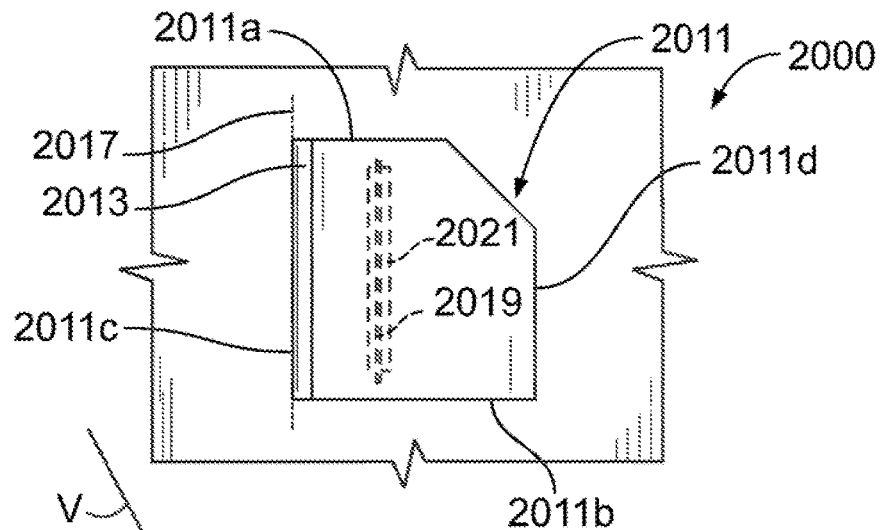
FIG. 20A is a top plan view of an eighteenth embodiment of a deployable vortex generator which incorporates the features of the present invention.
Figure 20B:
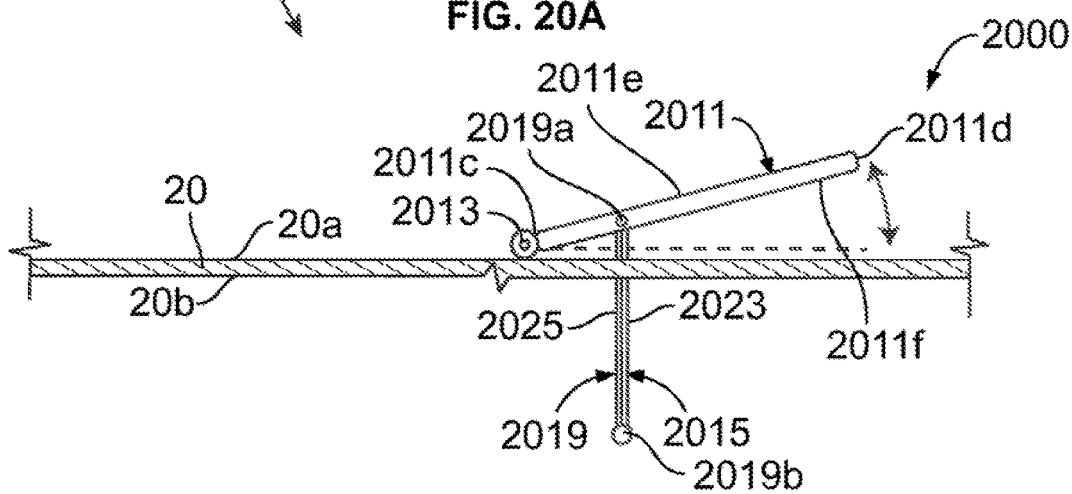
FIG. 20B is a side elevation view of the vortex generator of FIG. 20A in a deployed position.
Figure 20C:
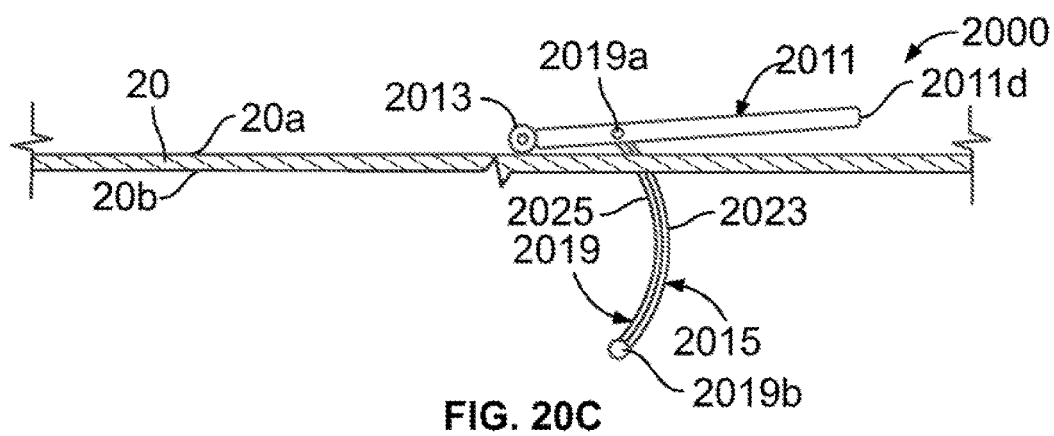
FIG. 20C is a side elevation view of the vortex generator of FIG. 20A in a retracted position.

Attention is invited to the specifics of the actuator 2015 of the eighteenth embodiment of the vortex generator 2000 shown in FIGS. 20A-20C. The actuator 2015 is formed from a bimetallic lever arm 2019. The lever arm 2019 has a first end 2019a attached to the vane 2011 and a second opposite end 2019b attached to a fixed point below the interior surface 20b of the lifting surface 20 (for example on a spar of the wing of the airplane). The lever arm 2019 is attached at its first end 2019a to the vane 2011 at position spaced from the hinge 2013. The fixed point where the second end 2019b is provided is aligned with the point where the second end 2019a is attached to the vane 2011 when the lever arm 2019 is in its deployed position. The lever arm 2019 extends through a slot 2021 in the lifting surface.

The lever arm 2019 is formed of a first layer 2023 and a second layer 2025 which are bonded together across the entire faying surface of the two layers 2023, 2025. The lever arm 2019 is generally rectangular and is planar when the vane 2011 is in a deployed position. The first layer 2023 is formed of a material which has a lower CTE than the material of which the second layer 2025 is formed.

At low speed flight, the vane 2011 is in its deployed position shown in FIG. 20B, and the temperature is greater than the temperature at cruising altitude. The vane 2011 is at an angle relative to the exterior surface 20a of the lifting surface 20. In this deployed position, the edge 2011d is positioned the furthest away from the lifting surface 20. Because the vortex generator 2000 is deployed, the vortex generator 2000 generates vortices (and accompanying drag) during takeoff. As the airplane climbs in altitude and the temperature decreases, the lever arm 2019 increases in curvature, causing the vane 2011 to rotate around the hinge 2013 and move the edge 2011d closer to the exterior surface 20a of the lifting surface 20, until the vane 2011 becomes substantially parallel to or flush with the exterior surface 20a of the lifting surface 20 and the vortex generator 2000 is in its retracted position, as shown in FIG. 20C. Because the first layer 2023 is formed of a material which has a lower CTE than the material of which the second layer 2025 is formed, the lever arm 2019 curves because of internal strains from the material expansion/contraction that are a result of temperature change in the two layers of materials having differing CTE. At this point the vortex generator 2000 is substantially removed from the airflow of the free stream velocity (V) to minimize the amount of drag it produces. During approach to landing, the air temperature rises and the lever arm 2019 straightens again moving the vane 2011 to its deployed position, generating vortices for landing. The slot 2021 is sized to accommodate the lever arm 2019 through its range of movement therethrough.

Figure 21A:
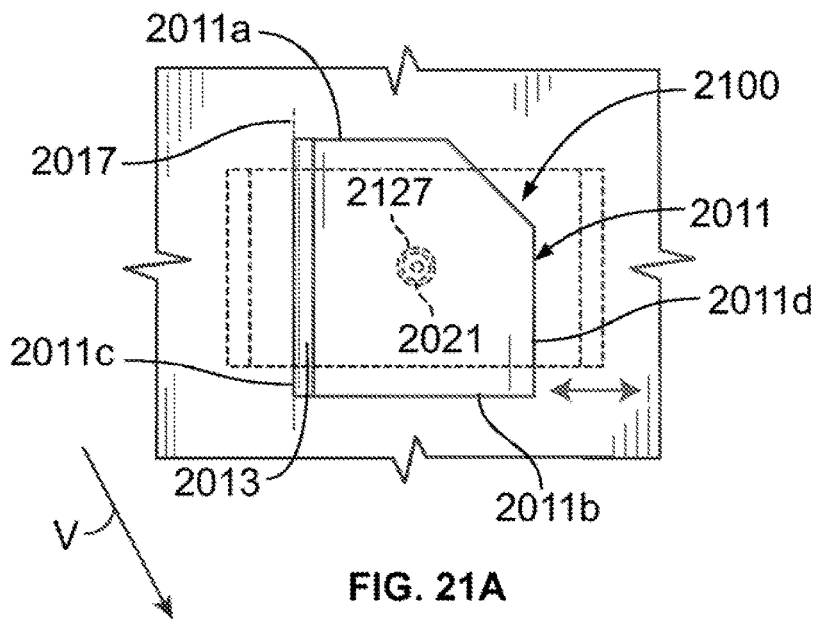
FIG. 21A is a top plan view of an eighteenth embodiment of a deployable vortex generator which incorporates the features of the present invention.
Figure 21C:
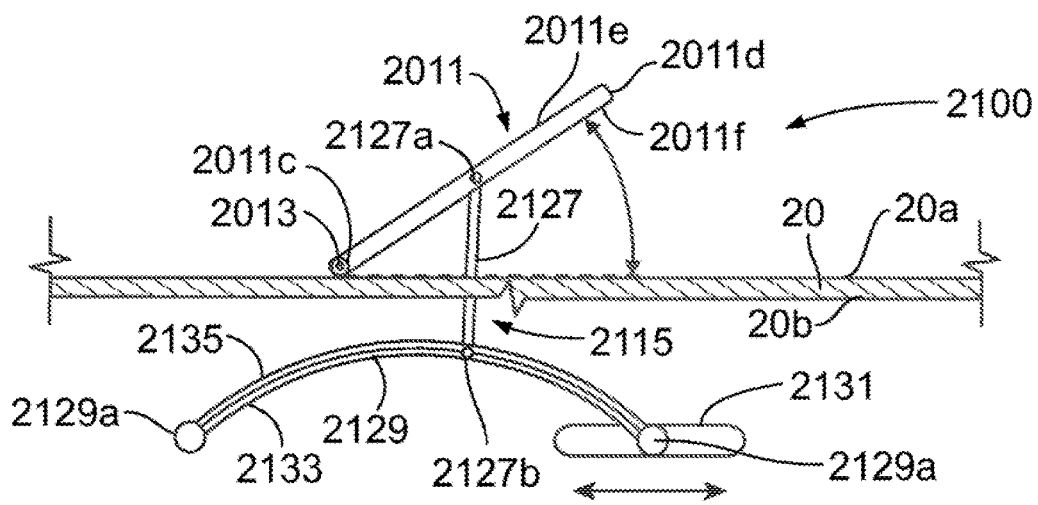
FIG. 21C is a side elevation view of the vortex generator of FIG. 21A in a retracted position.
Figure 21B:
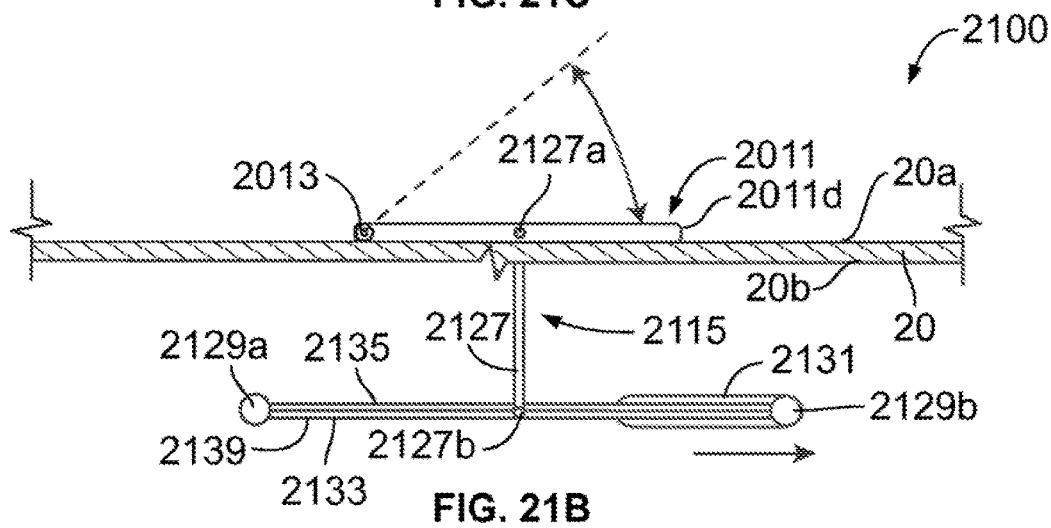
FIG. 21B is a side elevation view of the vortex generator of FIG. 21A in a deployed position.

Attention is now invited to the specifics of the actuator 2115 of the nineteenth embodiment of the vortex generator 2100 shown in FIGS. 21A-21C. The actuator 2115 is formed from a two-part lever arm having a first part 2127 and a second bimetallic part 2129. The first part 2127 extends through an opening 2021 in the lifting surface 20.

The first part 2127 is rigid and straight and has a first end 2127a attached to the vane 2011 and a second opposite end 2127b attached to a midpoint of the second part 2129. The first part 2127 is attached at its first end 2127a to the vane 2011 at position spaced from the hinge 2013.

The second part 2129 is positioned below the interior surface 20b of the lifting surface 20. The second part 2129 has a first end 2129a attached to a fixed point below the interior surface 20b of the lifting surface 20 (for example on a spar of the wing of the airplane), and an opposite end 2129b which seats in an elongated slot 2131 on the fixed point. The slot 2131 is parallel to the interior surface 20b of the lifting surface 20.

The second part 2129 is bimetallic and formed of a first layer 2133 and a second layer 2135 which are bonded together across the entire faying surface of the two layers 2133, 2135. The second part 2129 is generally rectangular and is planar when the vane 2011 is in a retracted position. The first layer 2133 is formed of a material which has a lower CTE than the material of which the second layer 2135 is formed.

At low speed flight, the vane 2011 is in its deployed position shown in FIG. 21B, and the temperature is greater than the temperature at cruising altitude. The vane 2011 is at an angle relative to the exterior surface 20a of the lifting surface 20. In this deployed position, the edge 2011d is positioned the furthest away from the lifting surface 20. Because the vortex generator 2100 is deployed, the vortex generator 2100 generates vortices (and accompanying drag) during takeoff. As the airplane climbs in altitude and the temperature decreases, the second part 2129 decreases in curvature, causing the end 2129b to slide along the slot 2131 so that the second part 2129 straightens, which causes the vane 2011 to rotate around the hinge 2013 and move the edge 2011d closer to the exterior surface 20a of the lifting surface 20, until the vane 2011 becomes substantially parallel to or flush with the exterior surface 20a of the lifting surface 20 and the vortex generator 2100 is in its retracted position, as shown in FIG. 21C. Because the first layer 2133 is formed of a material which has a lower CTE than the material of which the second layer 2135 is formed, the second part 2129 straightens because of internal strains from the material expansion/contraction that are a result of temperature change in the two layers of materials having differing CTE. At this point the vortex generator 2100 is substantially removed from the airflow of the free stream velocity (V) to minimize the amount of drag it produces. During approach to landing, the air temperature rises and the second part 2129 curves again moving the vane 2011 to its deployed position, generating vortices for landing. The slot 2021 is sized to accommodate the lever arm 2019 through its range of movement therethrough.

Figure 22A:
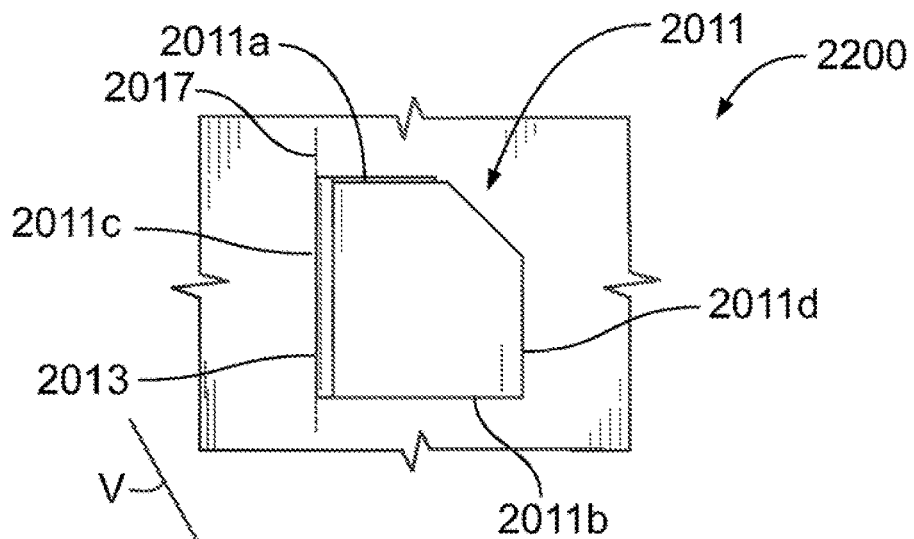
FIG. 22A is a top plan view of a nineteenth embodiment of a deployable vortex generator which incorporates the features of the present invention.
Figure 22B:
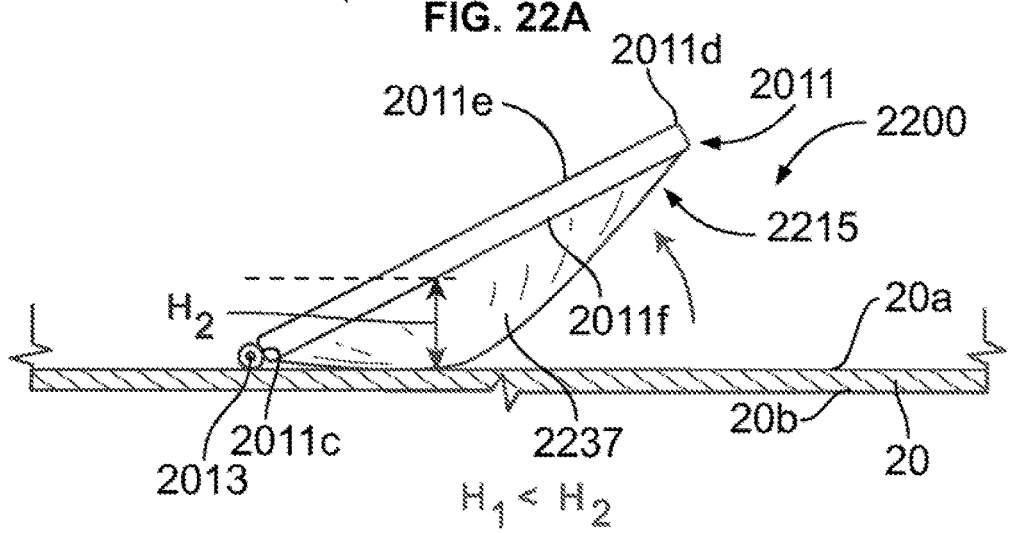
FIG. 22B is a side elevation view of the vortex generator of FIG. 22A in a deployed position.
Figure 22C:
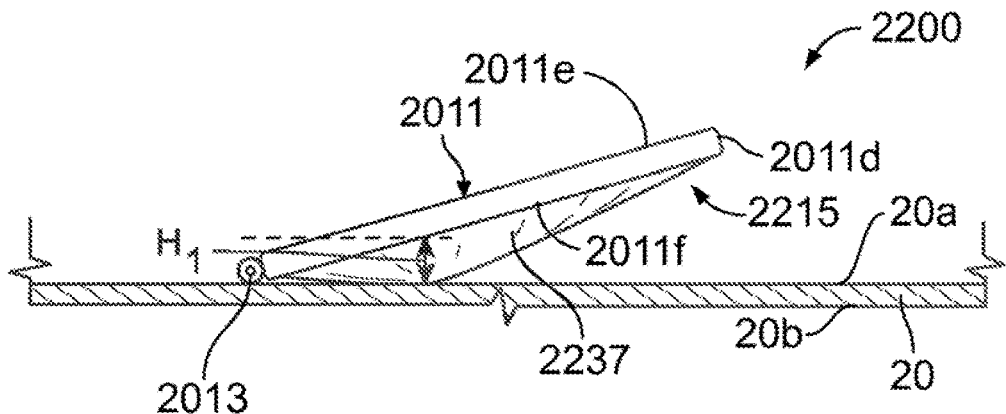
FIG. 22C is a side elevation view of the vortex generator of FIG. 22A in a retracted position.

Attention is now invited to the specifics of the actuator 2215 of the twentieth embodiment of the vortex generator 2200 shown in FIGS. 22A-22C. The actuator 2115 is formed from an expandable balloon 2237 which holds a fluid or gaseous substance therein. The balloon 2237 is attached to the inner surface 2011f of the vane 2011 and partially engages against the exterior surface 20a of the lifting surface. As such, the balloon 2237 is sandwiched between the lifting surface 20 and the vane 2011.

At low speed flight, the vane 2011 is in its deployed position shown in FIG. 22B, and the temperature is greater than the temperature at cruising altitude. The vane 2011 is at an angle relative to the exterior surface 20a of the lifting surface 20. In this deployed position, the edge 2011d is positioned the furthest away from the lifting surface 20. Because the vortex generator 2200 is deployed, the vortex generator 2200 generates vortices (and accompanying drag) during takeoff. As the airplane climbs in altitude and the temperature decreases, the balloon 2237 contracts, which causes the vane 2011 to rotate around the hinge 2013 and move the edge 2011d closer to the exterior surface 20a of the lifting surface 20, until the vane 2011 becomes substantially parallel to or flush with the exterior surface 20a of the lifting surface 20 and the vortex generator 2200 is in its retracted position, as shown in FIG. 22C. At this point the vortex generator 2200 is substantially removed from the airflow of the free stream velocity (V) to minimize the amount of drag it produces. During approach to landing, the air temperature rises and the balloon 2237 expands again moving the vane 2011 to its deployed position, generating vortices for landing.

The material used for the substance must have a volumetric response to changing temperature (from cruise altitude to the ground) which is greater than its response to atmospheric pressure changes over the same altitude range. The absolute temperature varies by a factor as small as about 1.2, while the pressure varies by a factor of about 4. Suitable liquid materials must have vapor pressure that satisfies two conditions: 1. at temperature at cruising altitude (about −50 C) the vapor pressure is less than the ambient pressure of about 0.25 bar, and 2. at surface temperatures (possibly as low as −20 C) the vapor pressure is at least equal to sea level atmosphere, i.e. 1 bar. Examples of suitable materials are, but are not limited to, formaldehyde, 1,1 difluoroethane (a refrigerant), and ammonia.

FIGS. 23A-23D show a twentieth embodiment of the vortex generator 2400. The vortex generator 2400 is formed from a generally L-shaped vane 2406 having a first leg 2451 which is parallel to the lifting surface 20 and a second leg 2453 which is perpendicular to the lifting surface 20 when the vane 2406 is in a deployed position as shown in FIGS. 23A and 23B. The first leg 2451 is attached to the exterior surface 20a of the lifting surface 20 by a firm bond 2472.

The vane 2406 is formed of a first layer 2468 and a second layer 2470 which are bonded together across the entire faying surface of the two layers 2468, 2470. The first layer 2468 is formed of a material which has a larger CTE than the material of which the second layer 2470 is formed. The second layer 2470 only extends along the second leg 2453 of the vane 2406. The vane 2406 has a leading edge 2406a, a trailing edge 2406b, opposite side edges 2406c, 2406d, outer surfaces 2406e, and an inner surface 2406f. An axis 2424 is defined along the side edge 2406c. The axis 2424 is oriented at roughly 20° relative to the direction of the free stream velocity (V).

At low speed, the vane 2406 is in is in its deployed position shown in FIGS. 23A and 23B, and the temperature is greater than the temperature at cruising altitude. The second leg 2453 of the vane 2406 is perpendicular relative to the lifting surface 20. The inner surface 2406f remains attached to the lifting surface 20 as a result of the firm bond 2472. Because the vortex generator 2400 is deployed, the vortex generator 2400 generates vortices (and accompanying drag) during takeoff. As the airplane climbs in altitude and the temperature decreases, the second leg 2453 curves relative to the lifting surface 20 and the vortex generator 2400 is in its retracted position, as shown in FIGS. 23C and 23D. Because the first layer 2468 is formed of a material which has a larger CTE than the material of which the second layer 2470 is formed, the vane 2406 curves because of internal strains from the material expansion/contraction that are a result of temperature change in the two layers of materials having differing CTE. At this point the vortex generator 2400 has a cross-section that is decreased with respect to the airflow of the free stream velocity (V) to minimize the amount of drag it produces. During approach to landing, the air temperature rises and the vortex generator 2400 straightens again moving to its deployed position, generating vortices for landing.

In this embodiment of the vortex generator 2400, the vortex generator 2400 does not completely retract in order to produce drag reduction. During cruise flight, the vane 2406 curves which decreases the cross-sectional area encountered by the airflow flowing along the free stream relative to the cross-sectional area encountered by the airflow flowing along the free stream during low speed. This does not completely retract the vortex generator 2400, but does reduce drag and related fuel burn.

The embodiments of deployable vortex generator reduce the vibrations and noise in its surrounding areas by minimizing or eliminating the unwanted vortices at cruising speed. In addition, embodiments of deployable vortex generator may reduce the cost of operation of the aircraft 21 by reducing fuel burn.

Illustrative, non-exclusive examples of inventive subject matter according to the present disclosure are described in the following enumerated paragraphs.

A1. A vortex generator attached to a lifting surface, comprising:
a vane moveable relative to the lifting surface, the vane moving in response to a change in ambient conditions.

A2. The vortex generator of paragraph A1, wherein the change in ambient conditions is a change in free stream velocity.

A3. The vortex generator of paragraph A1, wherein a surface of the vane is oriented approximately 10-25 degrees from a direction of the free stream velocity and approximately parallel to the lifting surface.

A4. The vortex generator of paragraph A1, wherein a rotational axis of the vane is oriented approximately 10-25 degrees from a direction of the free stream velocity.

A5. The vortex generator of paragraph A1, wherein an axis of the vane is perpendicular to the lifting surface.

A6. The vortex generator of paragraph A1, wherein the vane rotates relative to the lifting surface.

A7. The vortex generator of paragraph A1, wherein the vane is perpendicular to the lifting surface.

A8. The vortex generator of paragraph A7, wherein the vane moves from a deployed position wherein the vane is angled relative to the free stream velocity at a first angle, to a retracted position wherein the vane is angled relative to the free stream velocity at a second angle, the second angle being less than the first angle.

A9. The vortex generator of paragraph A8, further comprising a mount attached to the lifting surface, the vane is attached to the mount, and further comprising one of a spring and flexure attached between the mount and the vane.

A10. The vortex generator of paragraph A9, wherein the spring is one of a torsion spring, a compression spring, and a linear spring.

A11. The vortex generator of paragraph A8, wherein multiple springs or flexures are provided.

A12. The vortex generator of paragraph A1, wherein the vane moves from a deployed position wherein the vane is angled relative to the free stream velocity at a first angle, to a retracted position wherein the vane is angled relative to the free stream velocity at a second angle, the second angle being less than the first angle.

A13. The vortex generator of paragraph A1, further comprising a mount attached to the lifting surface, the vane is attached to the mount, wherein the vane is rotationally attached to the mount.

A14. The vortex generator of paragraph A1, wherein the vane is substantially parallel to the lifting surface when in a retracted position.

A15. The vortex generator of paragraph A14, wherein the vane moves from a deployed position wherein the vane is angled relative to the lifting surface at a first angle, to the retracted position wherein the vane is angled relative to the lifting surface at a second angle, the second angle being less than the first angle.

A16. The vortex generator of paragraph A15, further comprising a mount attached to the lifting surface, the vane is attached to the mount, and further comprising one of a spring and a flexure attached between the mount and the vane.

A17. The vortex generator of paragraph A16, wherein the spring is one of a torsion spring and a linear spring.

A18. The vortex generator of paragraph A17, wherein multiple springs or flexures are provided.

A19. The vortex generator of paragraph A1, wherein the change in ambient conditions is a change in temperature.

A20. The vortex generator of paragraph A19, wherein the vane is formed of a first layer of material having a first coefficient of thermal expansion and a second layer of material having a second coefficient of thermal expansion, said first and second layers being secured to each other along their faying surfaces, said first coefficient of thermal expansion is different than said second coefficient of thermal expansion, said vane attached to the lifting surface by a firm bond at a first end thereof.

A21. The vortex generator of paragraph A20, wherein said vane is substantially parallel to the lifting surface when the vane is in a retracted position.

A22. The vortex generator of paragraph A20, wherein said first layer is proximate to the lifting surface and said second layer is spaced from the lifting surface by said first layer.

A23. The vortex generator of paragraph A22, wherein the vane is bimetallic.

A24. The vortex generator of paragraph A22, wherein the first layer is formed of aluminum and the second layer is formed of titanium.

A25. The vortex generator of paragraph A22, wherein the first layer is formed of a carbon fiber and glass fiber composite having glass fibers running in a first direction, and the second layer is formed of a carbon fiber and glass fiber composite having the glass fibers running in a second direction which is transverse to the first direction.

A26. The vortex generator of paragraph A20, wherein each of said first and second layers are formed of a plurality of segments which gradually decrease in thickness.

A27. The vortex generator of paragraph A20, wherein a plurality of vanes are stacked together.

A28. The vortex generator of paragraph A27, wherein said vanes are separated from each other by a shear allowing bond.

A29. The vortex generator of paragraph A27, wherein a single monolayer vane portion is attached to an end of all of the vanes.

A30. The vortex generator of paragraph A29, wherein the monolayer vane portion is attached to the vanes by a firm bond.

A31. The vortex generator of paragraph A29, wherein the vanes are additionally separated from each other by a shear allowing bond.

A32. The vortex generator of paragraph A29, wherein the monolayer vane portion is at an end of the vanes opposite to the end where the firm bond is attached.

A33. The vortex generator of paragraph A29, wherein the monolayer vane portion is at end of the vanes proximate to the end where the firm bond is attached.

A34. The vortex generator of paragraph A29, further including a second monolayer vane portion attached to an opposite end of each vane.

A35. The vortex generator of paragraph A34, wherein each said second monolayer vane portion is attached to the respective vane by a firm bond.

A36. The vortex generator of paragraph A34, wherein each said second monolayer vane portion is separated from each other by a shear allowing bond.

A37. The vortex generator of paragraph A34, wherein the vanes have the same thickness.

A38. The vortex generator of paragraph A34, wherein the vanes have the same length.

A39. The vortex generator of paragraph A34, wherein the vanes have varying thicknesses.

A40. The vortex generator of paragraph A34, wherein the vanes have varying lengths.

A41. The vortex generator of paragraph A29, wherein the monolayer vane portion is attached to one of the vanes by a firm bond, and to the remaining vanes by shear allowing bonds.

A42. The vortex generator of paragraph A29, wherein the monolayer vane portion is attached to one of the vanes by a firm bond, and to the remaining vanes by movable joints.

A43. The vortex generator of paragraph A27, wherein each said vane is attached together by a firm bond proximate to end of each said vane.

A44. The vortex generator of paragraph A43, wherein a remainder of each vane is attached to an adjacent vane by a shear allowing bond.

A45. The vortex generator of paragraph A43, further comprising a monolayer vane portion attached to an outermost vane by a firm bond.

A46. The vortex generator of paragraph A20, further including a heating element for applying heat to the vane.

A47. The vortex generator of paragraph A20, further including a rigid stop attached to the vane.

A48. The vortex generator of paragraph A20, wherein said vane is generally L-shaped.

A49. The vortex generator of paragraph A19, further comprising a lever arm having at least a portion which is formed of a first layer of material having a first coefficient of thermal expansion and a second layer of material having a second coefficient of thermal expansion, said first and second layers being secured to each other along their faying surfaces, said first coefficient of thermal expansion is different than said second coefficient of thermal expansion, said lever arm attached to the lifting surface at one end thereof and attached to the vane at the opposite end thereof.

A50. The vortex generator of paragraph A49, wherein said vane is substantially parallel to the lifting surface when the vane is in a retracted position.

A51. The vortex generator of paragraph A49, wherein said vane is hingedly attached to the lifting surface.

A52. The vortex generator of paragraph A49, wherein said lever arm is formed of a first part which is secured to said vane, and a second part which is formed of said portion.

A53. The vortex generator of paragraph A52, wherein said second part has an end fixed to the lifting surface, and an opposite end which is slidably attached to the lifting surface.

A54. The vortex generator of paragraph A19, further including an expandable balloon mounted between said vane and the lifting surface, wherein when the temperature decreases, said balloon deflates.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A vortex generator attached to a lifting surface, comprising:
   a vane moveable relative to the lifting surface, the vane configured to move from a first position to a second position in response to an increase in ambient temperature and move from the second position to the first position in response to a decrease in the ambient temperature, the vane comprising:
   a stacked vane portion, comprising:
      a first layer comprising a first material having a first coefficient of thermal expansion;
      a second layer comprising a second material having a second coefficient of thermal expansion different from the first coefficient of thermal expansion, said first and second layers being secured directly to each other along entire faying surfaces of the first and second layers;
      a shear allowing layer disposed directly on the second layer;
      a third layer comprising the first material disposed directly on the shear allowing layer; and
      a fourth layer comprising the second material disposed directly on the third layer; and
   a monolayer vane portion attached at a joint to a distal end of the stacked vane portion, wherein a thickness of the monolayer vane portion at the joint is equal to a thickness of the stacked vane portion at the joint.

2. The vortex generator of claim 1, wherein the first layer is formed of aluminum and the second layer is formed of titanium.

3. The vortex generator of claim 1, wherein the first layer is formed of a first composite material having first reinforcing fibers arranged in a first direction, and the second layer is formed of a second composite material having second reinforcing fibers arranged in a second direction which is transverse to the first direction.

4. The vortex generator of claim 3, wherein at least one of the first composite material and the second composite material comprises carbon fibers and glass fibers, and wherein said glass fibers are arranged in the first direction or the second direction, respectively.

5. The vortex generator of claim 1, wherein the vane is attached to the lifting surface using a firm bond.

6. The vortex generator of claim 5, wherein the shear allowing layer comprises room temperature vulcanizing (RTV) silicone.

7. The vortex generator of claim 1, wherein the monolayer vane portion is attached to the stacked vane portion by a shear allowing bond.

8. The vortex generator of claim 1, wherein the lifting surface is selected from a wing, a control surface, a fuselage skin, and a nacelle, of an aircraft.

9. The vortex generator of claim 8, wherein the vortex generator is attached to the lifting surface by a firm bond selected from the group consisting of rivets, fasteners, glue, epoxy, diffusion bonding, and a clamp.

10. The vortex generator of claim 9, wherein the firm bond is glue, epoxy, or diffusing bonding, and the firm bond extends partially along the vane between the vane and the lifting surface.

11. The vortex generator of claim 9, wherein the firm bond is rivets.

12. The vortex generator of claim 9, wherein the firm bond is fasteners.

13. The vortex generator of claim 9, wherein the firm bond is a clamp.

14. The vortex generator of claim 9, wherein the firm bond is diffusion bonding.

15. The vortex generator of claim 9, wherein a first surface of the first layer is attached directly to the firm bond, and a second surface of the first layer opposite the first surface of the first layer is attached directly to the second layer, and wherein the first material has a greater coefficient of thermal expansion than the second material.

16. The vortex generator of claim 1, wherein the shear allowing layer comprises room temperature vulcanizing (RTV) silicone.

17. The vortex generator of claim 1, wherein upper and lower surfaces of the monolayer vane portion are coplanar with upper and lower surfaces of the stacked vane portion in the first position.

* * * * *